(12) United States Patent
Ji et al.

(10) Patent No.: US 12,108,396 B2
(45) Date of Patent: Oct. 1, 2024

(54) INFORMATION TRANSMISSION METHOD AND APPARATUS

(71) Applicant: Huawei Technologies Co., Ltd., Shenzhen (CN)

(72) Inventors: Liuliu Ji, Shanghai (CN); Shibin Ge, Shanghai (CN); Haicun Hang, Shanghai (CN); Xiaohan Wang, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 508 days.

(21) Appl. No.: 17/372,075

(22) Filed: Jul. 9, 2021

(65) Prior Publication Data
US 2021/0337529 A1    Oct. 28, 2021

Related U.S. Application Data

(63) Continuation of application No. PCT/CN2020/071602, filed on Jan. 11, 2020.

(30) Foreign Application Priority Data

Jan. 11, 2019   (CN) .......................... 201910028847.3

(51) Int. Cl.
*H04W 72/20*   (2023.01)

(52) U.S. Cl.
CPC .................................. *H04W 72/20* (2023.01)

(58) Field of Classification Search
CPC ..... H04W 72/20; H04B 7/026; H04B 7/0621; H04L 5/0057; H04L 5/0044; H04L 5/0053

USPC ......................................................... 370/329
See application file for complete search history.

(56) References Cited

U.S. PATENT DOCUMENTS

| | | | |
|---|---|---|---|
| 8,588,259 B2 | 11/2013 | Papasakellariou et al. | |
| 9,893,863 B2 * | 2/2018 | Takeda | H04L 5/0055 |
| 2014/0023011 A1 * | 1/2014 | Gao | H04L 1/0031 |
| | | | 370/329 |

(Continued)

FOREIGN PATENT DOCUMENTS

| | | |
|---|---|---|
| CN | 103001743 A | 3/2013 |
| CN | 103326764 | 9/2013 |

(Continued)

OTHER PUBLICATIONS

Ericsson et al., "Determination of CoMP Measurement and Reporting Sets," 3GPP TSG-RAN WG1 #67, San Francisco, USA, Nov. 14-Nov. 18, 2011, R1-114257, 2 pages.

*Primary Examiner* — Anh Ngoc M Nguyen
*Assistant Examiner* — Syed M Bokhari
(74) *Attorney, Agent, or Firm* — Slater Matsil, LLP

(57) ABSTRACT

This application provides an information transmission method and apparatus. The method includes: receiving, by a terminal device, a plurality of downlink data channels, where the plurality of downlink data channels are scheduled through a plurality of downlink control channels; determining, by the terminal device based on the plurality of downlink data channels, one or more pieces of feedback information corresponding to at least two downlink data channels; and sending, by the terminal device, the one or more pieces of feedback information through a same uplink control channel.

24 Claims, 8 Drawing Sheets

(56) References Cited

U.S. PATENT DOCUMENTS

| | | | | |
|---|---|---|---|---|
| 2014/0105057 A1* | 4/2014 | Liu | ................ | H04L 43/12 |
| | | | | 370/252 |
| 2015/0289259 A1* | 10/2015 | Yang | ................ | H04L 5/0055 |
| | | | | 370/329 |
| 2018/0027537 A1 | 1/2018 | Yang | | |
| 2018/0035459 A1* | 2/2018 | Islam | ................ | H04L 5/0053 |
| 2019/0103947 A1* | 4/2019 | Park | ................ | H04L 1/1861 |
| 2019/0190662 A1* | 6/2019 | Lee | ................ | H04L 1/188 |
| 2019/0223170 A1 | 7/2019 | Deng et al. | | |
| 2019/0386797 A1 | 12/2019 | Yang et al. | | |
| 2020/0036480 A1* | 1/2020 | Yang | ................ | H04L 1/1812 |

FOREIGN PATENT DOCUMENTS

| | | |
|---|---|---|
| CN | 105191176 | 12/2015 |
| CN | 106160983 | 11/2016 |
| CN | 106257856 | 12/2016 |
| CN | 107294583 | 10/2017 |
| CN | 108271262 | 7/2018 |
| CN | 109076521 | 12/2018 |
| WO | 2018054381 A1 | 9/2017 |
| WO | 2017217797 A1 | 12/2017 |

\* cited by examiner

INFORMATION TRANSMISSION METHOD AND APPARATUS

CROSS-REFERENCE TO RELATED APPLICATIONS

This application is a continuation of International Application No. PCT/CN2020/071602, filed on Jan. 11, 2020, which claims priority to Chinese Patent Application No. 201910028847.3, filed on Jan. 11, 2019. The disclosures of the aforementioned applications are hereby incorporated by reference in their entireties.

TECHNICAL FIELD

This application relates to the communications field, and more specifically, to an information transmission method and apparatus.

BACKGROUND

In network element interaction in a communications system, a network element usually needs feedback information from another network element. For example, a terminal device needs to feed back information to a network device. The feedback information may be used to reflect a transmission status (for example, whether a data channel is correctly received), a channel status, and the like. The terminal may send the feedback information to the base station through an uplink channel.

In a multipoint coordination technology, a terminal device may be scheduled by a plurality of transmission points. For example, the plurality of transmission points schedule the terminal to receive a plurality of pieces of data. In this scenario, the terminal device feeds back information to a plurality of base stations through a plurality of uplink channels. When a physical uplink control channel (PUCCH) has no good spatial directivity and if the terminal device sends the PUCCH omni-directionally in space, the PUCCH sent to a base station may also be received by another base station may also receive the PUCCH. In this case, the channel causes interference to uplink receiving of the another base station. In addition, if the terminal device needs to separately send the PUCCH to the plurality of base stations, a plurality of resources need to be consumed, causing large resource overheads.

SUMMARY

In view of this, this application provides an information transmission method and apparatus, so that a terminal device sends one or more pieces of feedback information through a same uplink control channel, and this helps save resources of the terminal device.

According to a first aspect, an information transmission method is provided, including:

A terminal device receives a plurality of downlink data channels, where the plurality of downlink data channels are scheduled through a plurality of downlink control channels; the terminal device determines, based on the plurality of downlink data channels, one or more pieces of feedback information corresponding to at least two downlink data channels; and the terminal device sends the one or more pieces of feedback information through a same uplink control channel. Compared with a manner in which the terminal device sends feedback information to a network device through a plurality of uplink control channels in the conventional technology, the technical solution in this embodiment of this application helps save sending resources of the terminal device.

In a possible implementation, the method further includes:

The terminal device determines a carrying manner of the one or more pieces of feedback information on the uplink control channel, where the carrying manner includes any one of the following:

The one or more pieces of feedback information are carried on the uplink control channel, where the uplink control channel includes first indication information, and the first indication information is used to indicate a downlink data channel corresponding to one piece of feedback information in the one or more pieces of feedback information; the plurality of pieces of feedback information are carried on the uplink control channel through joint encoding; or the one or more pieces of feedback information are carried on the uplink control channel through separate encoding, where the one or more pieces of feedback information are separately encoded in a predetermined sequence.

Herein, the terminal device may use the uplink control channel to carry the feedback information in any one of the foregoing carrying manners. Therefore, the carrying manner of the feedback information in this embodiment of this application is relatively flexible.

In a possible implementation, the method further includes:

The terminal device determines a first downlink control channel from the plurality of downlink control channels based on time domain resources or frequency domain resources on which the plurality of downlink control channels are located, or aggregation levels of the plurality of downlink control channels; the terminal device determines the transmission resource based on resource indication information carried on the first downlink control channel, where the resource indication information indicates the transmission resource used to transmit the uplink control channel; and the terminal device sends the uplink control channel through the transmission resource.

Herein, the terminal device may select the first downlink control channel from the plurality of downlink control channels, and can send the uplink control channel through the transmission resource determined based on the resource indication information carried on the first downlink control channel.

Optionally, the first downlink control channel is a downlink control channel with a largest resource index in the plurality of downlink control channels, and the resource index is an index of a time domain resource on which the downlink control channel is located; or the first downlink control channel is a downlink control channel with a smallest second resource index in the plurality of downlink control channels, and the resource index is an index of a frequency domain resource on which the downlink control channel is located; or the first downlink control channel is a downlink control channel with a highest resource aggregation level index in the plurality downlink control channels, and the resource aggregation level index is an index of a resource aggregation level of the downlink control channel.

Herein, the terminal device may determine the first downlink control channel based on a time domain resource index, a frequency domain resource index, or a resource aggregation level index. Therefore, in this embodiment of this application, a manner of determining the first downlink control channel is relatively flexible.

Optionally, data transmitted on each of the plurality of downlink data channels is same or different data in a same codeword of a same transport block, same or different data in different codewords of a same transport block, or data in different transport blocks.

The data transmitted on the downlink data channel is not specifically limited in this embodiment of this application, and compatibility is relatively good.

Optionally, the plurality of downlink data channels is scheduled for the terminal device by a same network device or a plurality of different network devices.

Therefore, the technical solution in this embodiment of this application is applicable to a case of one network device or a case of a plurality of network devices.

According to a second aspect, an information transmission method is provided, including:

A network device sends one or more downlink data channels to a terminal device; the network device receives one or more pieces of feedback information sent by the terminal device through a same uplink control channel; and the network device decodes the one or more pieces of feedback information, to determine feedback information corresponding to the one or more downlink data channels. Compared with the conventional technology that the network device needs to perform interference cancellation on an uplink control channel that is not expected to be received, the technical solution in this embodiment of this application helps avoid unnecessary interaction overheads of the network device.

In a possible implementation, the uplink control channel includes one or more pieces of first indication information, and the first indication information is used to indicate a downlink data channel corresponding to one piece of feedback information in the one or more pieces of feedback information; and that the network device decodes the one or more pieces of feedback information, to determine feedback information corresponding to the one or more downlink data channels includes:

The network device determines, based on the one or more pieces of first indication information, one or more pieces of feedback information corresponding to the one or more downlink data channels.

In a possible implementation, the plurality of pieces of feedback information are carried on the uplink control channel through joint encoding; and that the network device decodes the one or more pieces of feedback information, to determine feedback information corresponding to the one or more downlink data channels includes:

The network device decodes the plurality of pieces of feedback information that are jointly encoded, to determine one or more pieces of feedback information corresponding to the one or more downlink data channels.

In a possible implementation, the one or more pieces of feedback information are carried on the uplink control channel through separate coding, and the one or more pieces of feedback information are separately encoded in a predetermined sequence; and that the network device decodes the one or more pieces of feedback information, to determine feedback information corresponding to the one or more downlink data channels includes:

The network device decodes the one or more pieces of feedback information that are separately encoded, and determines, based on the predetermined sequence, the one or more pieces of feedback information corresponding to the one or more downlink data channels.

In a possible implementation, the method further includes:

The network device sends one or more downlink control channels to the terminal device, where each downlink control channel carries a corresponding time domain resource, frequency domain resource, or resource aggregation level.

Therefore, the network device may carry the corresponding time domain resource, frequency domain resource, or resource aggregation level on the downlink control channel, so that the terminal device can select a first downlink control channel from the plurality of downlink control channels based on the time domain resource, the frequency domain resource, or the resource aggregation level corresponding to the downlink control channel.

According to a third aspect, a communications apparatus is provided, and includes various modules or units configured to perform the method according to any possible implementation of the first aspect.

According to a fourth aspect, a communications apparatus is provided, and includes a processor. The processor is coupled to a memory, and may be configured to execute instructions in the memory, to implement the method according to any possible implementation of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface maybe an input/output circuit.

According to a fifth aspect, a communications apparatus is provided, and includes various modules or units configured to perform the method according to any possible implementation of the second aspect.

According to a sixth aspect, a communications apparatus is provided, and includes a processor. The processor is coupled to a memory, and may be configured to execute instructions in the memory, to implement the method according to any possible implementation of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to a seventh aspect, a processor is provided, and includes an input circuit, an output circuit, and a processing circuit. The processing circuit is configured to receive a signal through the input circuit, and transmit a signal through the output circuit, so that the processor performs the method according to any possible implementation of the first aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to an eighth aspect, a processor is provided, and includes an input circuit, an output circuit, and a processing circuit. The processing circuit is configured to receive a signal through the input circuit, and transmit a signal through the output circuit, so that the processor performs the method according to any possible implementation of the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a ninth aspect, a processing apparatus is provided, and includes a processor and a memory. The processor is configured to read instructions stored in the memory, receive a signal through a receiver, and transmit a signal through a transmitter, to perform the method according to any possible implementation of the first aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process, for example, receiving of a plurality of downlink data channels may be a process of inputting the information from the processor, and sending of one or more pieces of feedback information through a same uplink control channel may be a process for the processor to receive output capability information. Specifically, data output by the processor may be output to the transmitter, and input data received by the processor may be from the receiver. The transmitter and the receiver may be collectively referred to as a transceiver.

The processing apparatus according to the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor, and exists independently.

According to a tenth aspect, a processing apparatus is provided. The processing apparatus includes a processor and a memory. The processor is configured to read instructions stored in the memory, receive a signal through a receiver, and transmit a signal through a transmitter, to perform the method according to any possible implementation of the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process, for example, sending of one or more downlink data channels may be a process of outputting information from the processor, and receiving of one or more pieces of feedback information may be a process of receiving input capability information by the processor. Specifically, data output by the processor may be output to the transmitter, and input data received by the processor may be from the receiver. The transmitter and the receiver may be collectively referred to as a transceiver.

The processing apparatus according to the tenth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor, and exists independently.

According to an eleventh aspect, a computer program product is provided. The computer program product includes a computer program (which may also be referred to as code or instructions). When the computer program is run, a computer is enabled to perform the method according to any possible implementation of the first aspect.

According to a twelfth aspect, a computer program product is provided. The computer program product includes a computer program (which may also be referred to as code or instructions). When the computer program is run, a computer is enabled to perform the method according to any possible implementation of the second aspect.

According to a thirteenth aspect, a computer-readable medium is provided. The computer-readable medium stores a computer program (which may also be referred to as code or instructions). When the computer program is run on a computer, the computer is enabled to perform the method according to any possible implementation of the first aspect.

According to a fourteenth aspect, a computer-readable medium is provided. The computer-readable medium stores a computer program (which may also be referred to as code or instructions). When the computer program is run on a computer, the computer is enbaled to perform the method in the second aspect.

According to a fifteenth aspect, a communications system is provided, and includes the foregoing network device and terminal device.

DETAILED DESCRIPTION OF ILLUSTRATIVE EMBODIMENTS

Figure 1:
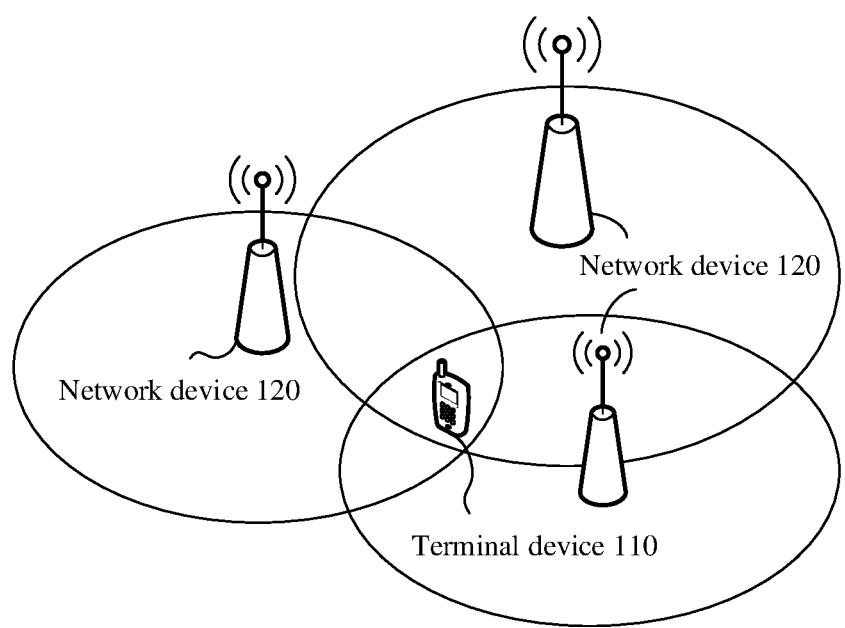
FIG. 1 is a schematic diagram of an application scenario of multipoint transmission according to this application.

The following describes technical solutions in this application with reference to accompanying drawings.

The technical solutions in embodiments of this application may be applied to various communications systems such as a global system for mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, a 5th generation (5G) system, or a new radio (NR) system.

The following describes some terms in this application, to facilitate understanding of a person skilled in the art.

(1) A terminal device, also referred to as user equipment (UE), a mobile station (MS), a mobile terminal (MT), or the like, is a device that provides voice/data connectivity for a user, for example, a handheld device or a vehicle-mounted device having a wireless connection function. Currently, for example, the terminal is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

(2) A network device is a device in a wireless network, for example, a radio access network (RAN) node that enables a terminal to access the wireless network. Currently, for example, the RAN node is a gNB, a transmission reception point (TRP), an evolved NodeB (eNB), a radio network controller (radio network controller, RNC), a NodeB (NB), a base station controller (BSC), a base transceiver station (BTS), a home base station (for example, a home evolved NodeB or a home NodeB, HNB), a baseband unit (BBU), and a wireless fidelity (wireless fidelity, Wifi) access point (AP). In a network structure, the network device may include a centralized unit (CU) node, a distributed unit (DU) node, or a RAN device including a CU node and a DU node.

(3) "A plurality of" indicates two or more, and another quantifier is similar to this. The term "and/or" describes an association relationship for describing associated objects and represents that three relationships may exist. For example, A and/or B may represent the following three cases: Only A exists, both A and B exist, and only B exists.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but are not limited to a radio channel and various other media that can store, include, and/or carry instructions and/or data.

FIG. 1 is a schematic diagram of an application scenario of multipoint transmission according to this application. As shown in FIG. 1, a terminal device 110 is covered by a plurality of network devices 120. The terminal device 110 may communicate with the network devices 120. A data channel and a control channel received by the terminal device 110 may be from the plurality of network devices 120. The terminal device 110 sends feedback information of the data channel to the plurality of network devices 120, for example, hybrid automatic repeat request (HARQ-ACK) information. The HARQ-ACK information may include an acknowledgement (ACK), a negative-acknowledgement (NACK), or information indicating another state, or the like.

For example, a transmission point TRP is deployed on each network device 120, and a plurality of TRPs may be deployed on different network devices 120. After a baseband processing unit of each network device 120 generates a downlink control channel, the downlink control channel is sent by the transmission point TRP deployed on each network device 120. The plurality of network devices 120 may schedule data independently with limited interaction.

Alternatively, a plurality of TRPs may be deployed on a same network device 120. In this scenario, the plurality of TRPs may be physically understood as a group of antennas. The group of antennas includes at least one antenna. An architecture of the group of antennas may be that the baseband processing unit of the network device 120 that is located at a geographical location connects a plurality of radio frequency processing units at a plurality of geographical locations, and there is a group of antennas at each of the plurality of geographical locations. A distance between the baseband processing unit and the radio frequency processing unit of the network device 120 may be hundreds of meters, and the baseband processing unit and the radio frequency processing unit may be connected through an optical fiber. Therefore, a transmission time between the baseband processing unit and the radio frequency processing unit is relatively short, and a transmission capacity is relatively large. After the baseband processing unit of the network device 120 processes a baseband signal, if a signal of a downlink control channel is generated, the signal of the downlink control channel is first transmitted to the plurality of TRPs, and then the downlink control channel is sent by each of the plurality of TRPs.

It should be understood that, in the embodiments of this application, the control channel may include another physical layer control channel such as a physical downlink control channel (PDCCH) or an enhanced physical downlink control channel (EPDCCH). However, for ease of description, the following terms or concepts are described only by using a PDCCH as an example. However, the embodiments of this application are not limited thereto.

For ease of understanding, the following briefly describes some terms or concepts in the embodiments of this application.

1. A hybrid automatic repeat request (HARQ) is a technology combining a forward error correction (FEC) method and an automatic repeat request (ARQ) method. The FEC enables a receive end to correct some errors by adding redundant information, to reduce a quantity of retransmissions. For an error that cannot be corrected through the FEC, the receive end requests a transmit end to retransmit data by using an ARQ mechanism. The receive end detects, by using an error detection code, for example, a cyclic redundancy check (CRC), whether an error occurs in a received data packet. If no error occurs, the receive end sends an acknowledgement (ACK) to the transmit end, and after receiving the ACK, the transmit end sends a next data packet. If an error occurs, the receive end sends a negative-acknowledgement (NACK) to the transmit end, and after receiving the NACK, the transmit end retransmits the data packet. In a HARQ mechanism, a piece of data may be sent for a plurality of times, and data sent in the plurality of times may be different RVs of the data, and data rates, spatial domain information, and the like in the plurality of times of sending may also be different. The data sent for the plurality of times can be combined and decoded to obtain original data. In addition, the transmit end may also actively retransmit data without receiving the ACK/NACK sent by the receive end.

2. A basic composition unit of a time-frequency resource corresponding to a PDCCH is a control channel element (CCE). A PDCCH occupies one or more CCEs. Occupying more CCE indicates higher reliability of a PDCCH, but consumes more resources. When a user-specific PDCCH occupies some CCEs, a PDCCH of another user usually does not occupy these CCEs. That is, a limited total quantity of resources can support a limited total quantity of scheduled PDCCHs. The resources may include at least one type of time domain resources, frequency domain resources, or code domain resources.

3. A CCE includes six resource element groups (REG), and a resource of an REG includes a resource block RB in frequency domain and a symbol in time domain, such as an orthogonal frequency division multiplexing (OFDM) symbol. There is a mapping relationship between a CCE and an REG. That is, a plurality of RBs and a plurality of symbols on time-frequency resources form a plurality of REGs, and these REGs are mapped to a CCE according to some mapping relationships. The mapping may be direct mapping (for example, six contiguous REGs form a CCE) or interleaving mapping (REGs are interleaved and then mapped to the CCE) and the like, and this is not limited. A quantity of CCEs forming a PDCCH is referred to as an aggregation level of the CCEs.

4. A terminal device detects a PDCCH in a specific resource range, where the resource may be at least one of a time domain resource, a frequency domain resource, or a code domain resource. The specific resource range may be at least one of a control resource set (CORESET) or a search space (SS). The CORESET defines a possible resource range for the terminal device to detect a frequency domain position of the PDCCH. A network device may configure, for the terminal device, one or more pieces of information in an identifier of the CORESET, a DMRS scrambling identifier of the PDCCH, a frequency domain precoding granularity, a symbol length, a frequency domain position, a mapping mode between a CCE and an REG, a quasi-co-location assumption for receiving the PDCCH, and whether there is a transmission configuration indication (TCI) configuration field in DCI of the PDCCH received in the CORESET.

5. A CORESET may be associated with one or more search spaces search space. The search space defines a possible time-domain resource range for detecting a PDCCH. A network device may configure one or more of the following for a terminal device: an identifier of a search space, an identifier of a CORESET associated with the search space, a detection period and a time unit offset of the PDCCH, a time domain detection pattern, a quantity (which may be 0) of possible PDCCH candidates for each aggregation level, a type of the search space (indicating whether the search space is common or terminal device-specific, where the common search space means that another user may detect the search space), a configuration related to a DCI format (such as a possibility of a format of to-be-detected DCI), or a consecutive length in time domain. The PDCCH candidate corresponds to a possible PDCCH candidate resource. For example, the terminal may receive PDCCHs on a plurality of time-frequency resource sets within a specific time-frequency resource range. The plurality of possibilities are referred to as the PDCCH candidate. The time domain detection pattern is used to indicate a possible symbol location for detecting the PDCCH in a slot in the search space. For example, the time domain detection pattern may indicate one or more symbol locations. These symbol locations correspond to first symbol locations at which the possible PDCCHs start. For example, the time domain detection pattern may indicate symbol locations l1, l2, and l3, so that the terminal device may separately detect a PDCCH at locations with l1, l2, and l3 as starting symbols, where l1 represents an identifier of a symbol location 1, l2 represents an identifier of a symbol location 2, and l3 represents an identifier of a symbol location 3. Optionally, a value of the symbol locations may start from 0. This is not limited. The symbols are OFDM symbols.

The quantity (which may be 0) of possible PDCCH candidates for each aggregation level means that if a plurality of PDCCHs correspond to different aggregation levels, for example, 1, 2, 4, 8, and 16, the network device may configure, for the terminal device, a quantity of possible PDCCH candidates for each PDDCH in a search space. When search spaces of a plurality of control channels overlap in time domain, it means that the terminal may need to detect the plurality of PDCCHs in a same time domain unit. In other words, a plurality of transmission points may send the PDCCHs to the UE in the same time domain unit. The consecutive length is duration of the search space in time domain time units. A slot is used as an example. If a period k and duration d are configured, it means that the PDCCH may be detected in the search space in all of d persistent slots starting from a slot that meets a period and an offset of the search space.

In this way, in the time-frequency resource defined in the search space associated with the CORESET, the terminal device attempts to detect, by using an aggregation level that needs to be detected, a PDCCH that meets the aggregation level. For an aggregation level, a quantity of possible PDCCHs detected by the terminal device does not exceed a maximum quantity of PDCCH candidates configured for each aggregation level.

CCE locations at which the terminal device detects the PDCCH meet a specific rule. The rule may be expressed in a form of a formula, a table, or the like. For example, the following formula defines a possible CCE location for detecting a PDCCH:

$$L \cdot \left\{ \left( Y_{p,n_{s,f}^\mu} + \left\lfloor \frac{m_{s,nCI} \cdot N_{CCE,p}}{L \cdot M_{p,s,max}^{(L)}} \right\rfloor + n_{CI} \right) \mod \lfloor N_{CCE,p}/L \rfloor \right\} + i$$

L is an aggregation level. $Y_{p,n_{s,f}^\mu}$ is a dependent variable of a function that uses information such as a CORESET identifier, a time unit identifier ($n_{s,f}^\mu$), and an RNTI of the terminal device as independent variables, where different CORESET identifiers may correspond to different $Y_{p,n_{s,f}^\mu}$. $m_{s,nCI}$ is an identifier of a PDCCH candidate, $N_{CCE,p}$ is a total quantity of CCEs, $M_{p,s,nCI}^{(L)}$ is a maximum possible quantity of PDCCH candidates for the aggregation level L, and the value of i ranges from 0 to L−1, which indicates that possible CCE locations occupy L consecutive CCEs.

It should be understood that, in the embodiments of this application, a description is provided by using an example in which the downlink control channel is the physical downlink control channel PDCCH, but this does not constitute a limitation on the embodiments of this application. Actually, the downlink control channel may also be defined as another term or concept, which is applicable to the technical solutions in the embodiments of this application. In the embodiments of this application, the downlink control channel and the PDCCH may be alternately used. It may be considered that the PDCCH is an example description of the downlink control channel.

It should be further understood that, in the embodiments of this application, a description is provided by using an example in which a downlink shared channel is a physical downlink shared channel (PDSCH), but this does not constitute a limitation on the embodiments of this application. Actually, the downlink shared channel may also be defined as another term or concept, which is applicable to the technical solutions in the embodiments of this application. In the embodiments of this application, the downlink shared channel and the PDSCH may be alternately used. It may be considered that the PDSCH is an example description of the downlink shared channel.

6. The following briefly describes a correspondence between a transport block, a codeword, and a transport layer that are corresponding to data.

From the perspective of a physical layer, the data has one or two transport blocks transmitted from a higher layer. A transport block is mapped to a plurality of codewords. The mapping between the transport block and the codewords may be determined based on a predefined sequence or a mapping relationship indicated by the network device by using indication information (the indication information may be sent to the terminal device by using RRC, a MAC CE, or DCI), and this is not limited. The predefined sequence may be: a transport block with a smaller identifier is mapped to a codeword with a smaller identifier, for example, a TB 0 is mapped to a CW 0, and a TB 1 is mapped to a CW 1. Alternatively, the transport block is mapped to the codeword in ascending order of identifiers. For example, when there is only a TB 0, the TB 0 is mapped to a CW 0, or when there is only a TB 1, the TB 1 is mapped to a CW 0, or when there are a TB 0 and a TB 1, the TB 0 and the TB 1 are one-to-one mapped to a CW 0 and a CW 1. The mapping between the codeword and the transport layer may be mapped according to a predefined relationship, or may be indicated by the network device to the terminal device by using indication information (which may be information related to multipoint coordination). A quantity of transport layers is not less than a quantity of codewords, and the quantity of codewords is not less than a quantity of transport blocks.

In the embodiments of this application, the plurality of downlink data channels may be different data at different transport layers of a same codeword of a same transport block. That is, the data of the codeword is separately mapped to the different transport layers, and the different transport layers are transmitted through the downlink data channels sent by different network devices.

As shown in the following Table 1, a transport layer 2 is used as an example, $d^{(0)}(i)$ is a data stream in the codeword, and the superscript of $d^{(0)}(i)$ is an index of the codeword; $x^{(0)}(i)$ or $x^{(1)}(i)$ is a data stream at the ith layer, and the superscript of $x^{(0)}(i)$ or $x^{(1)}(i)$ is an index of the layer. M represents a length of a symbol or a bit stream. In Table 1, a length $M_{symb}^{layer}$ of the symbol or the bit stream at a transport layer is half of a length $M_{symb}^{(0)}$ of the symbol/bit stream in a codeword (the index of the codeword is 0). That is, the symbol/bit stream on a codeword is evenly mapped to two transport layers (2 layers).

TABLE 1

| 2 layers | 1 codeword | $x^{(0)}(i) = d^{(0)}(2i)$ | $M_{symb}^{layer} = M_{symb}^{(0)}/2$ |
| --- | --- | --- | --- |
| | | $x^{(1)}(i) = d^{(0)}(2i + 1)$ | |

Alternatively, the plurality of downlink data channels may be same data at different transport layers of a same codeword of a same transport block. That is, the data of the codeword is mapped to the transport layers, and the data mapped to at least two transport layers is the same. As shown in the following Table 2, if a layer of data is mapped to each of two transport layers, lengths of data streams of the transport layer and the codeword are the same. In Table 2, a length $M_{symb}^{layer}$ of a symbol/bit stream at a transport layer is the same as a length $M_{symb}^{(0)}$ of a symbol/bit stream in a codeword (an index of the codeword is 0).

TABLE 2

| 2 layers | 1 codeword | $x^{(0)}(i) = d^{(0)}(i)$ | $M_{symb}^{layer} = M_{symb}^{(0)}$ |
| --- | --- | --- | --- |
| | | $x^{(1)}(i) = d^{(0)}(i)$ | |

Alternatively, the plurality of downlink data channels may be different data on different codewords of a same transport block. Herein, a transport block is mapped to a plurality of different codewords. For a mapping method, refer to the foregoing description. Transport layers of the different codewords are different.

Alternatively, the plurality of downlink data channels may be same data on different codewords of a same transport block.

Alternatively, the plurality of downlink data channels may be different data on different transport blocks (different codewords).

7. A terminal device determines a downlink control channel resource based on the following formula:

$$r_{PUCCH} = \left\lfloor \frac{2 \cdot n_{CCE,0}}{N_{CCE}} \right\rfloor + 2 \cdot \Delta_{PRI}$$

$0 \leq r_{PUCCH} \leq 15$ is a resource identifier of a PUCCH, $N_{CCE}$ is a total quantity of CCEs in a CORESET, $n_{CCE,0}$ is an identifier of the first CCE on which a detected PDCCH is located, and $\Delta_{PRI}$ is indicated by a PUCCH resource indicator field in DCI.

A general description is provided herein: A time domain unit in the embodiments of this application may include one or more time sampling points, and may be a frame, a radio frame, a system frame, a subframe, a half-frame, a slot, a mini-slot, a symbol, or the like. This is not limited.

A frequency domain unit in the embodiments of this application may include one or more subcarriers, and may be a subcarrier, a resource block, a resource block group, a serving cell, or the like. This is not limited.

In multipoint transmission, the terminal device sends feedback information to a network device through a plurality of uplink control channels. This consumes a plurality of resources, and causes additional overheads. In addition, if the plurality of uplink control channels are received, the network device also needs to perform interference cancellation on an uplink control channel that is not expected to be received, and this increases extra load on the network device. To avoid these problems, a technical solution of sending one or more pieces of feedback information to a plurality of network devices through one uplink control channel is used in the embodiments of this application.

Figure 2:
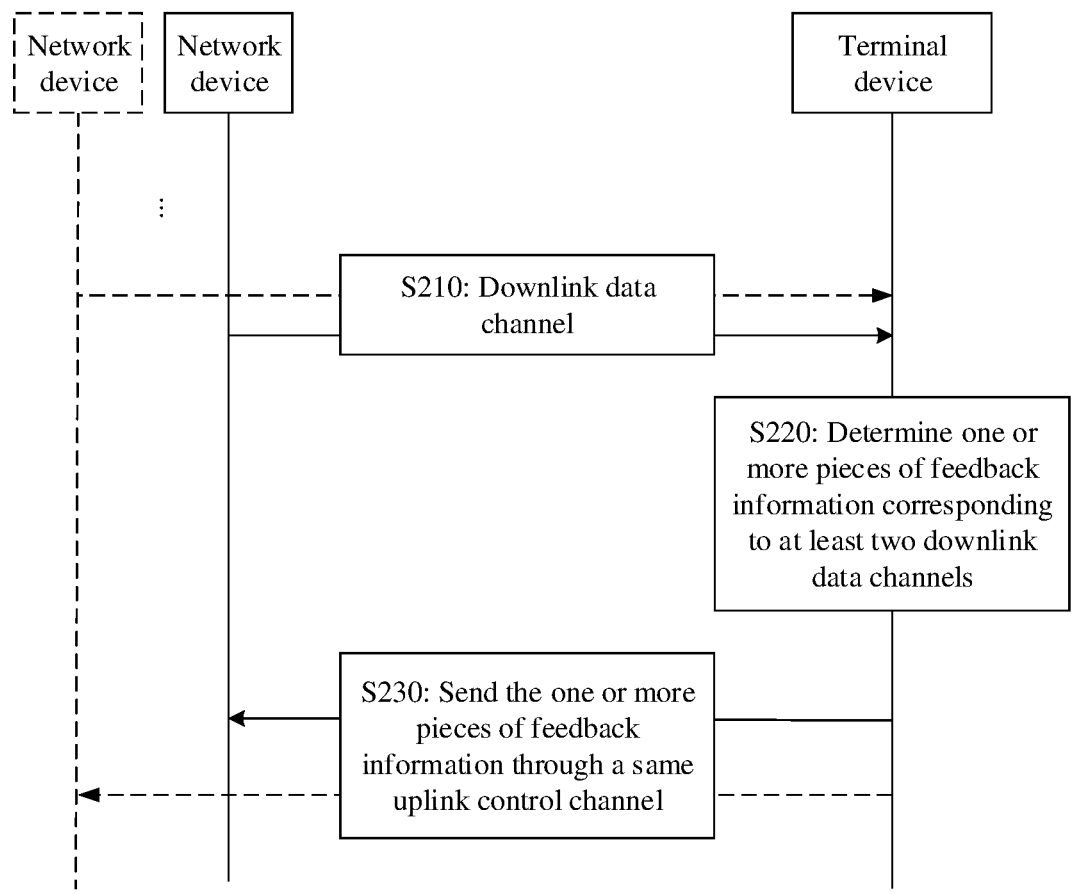
FIG. 2 is a schematic flowchart of an information transmission method according to an embodiment of this application.

FIG. 2 is a schematic flowchart of an information transmission method 200 according to an embodiment of this application. As shown in FIG. 2, the method 200 includes the following operations.

S210: A terminal device receives a plurality of downlink data channels, where the plurality of downlink data channels are scheduled through a plurality of downlink control channels.

The plurality of downlink data channels may be sent to the terminal device by one or more network devices. In other words, one network device may send the plurality of downlink data channels to the terminal device, for example, send the plurality of downlink data channels through a group of antennas. Alternatively, a plurality of network devices send the plurality of downlink data channels to the terminal device.

The information transmission method in this embodiment of this application may be applied to a coordinated multi-point technology, and the terminal device may establish a connection to at least one of the plurality of network devices.

An example in which the network device is a TRP is used for description. In a scenario in which the TRP performs scheduling by a centralized scheduler, scheduling data of the plurality of downlink control channels may be sent by one TRP, and the plurality of downlink data channels may also be sent to the terminal device by a plurality of different TRPs. The plurality of downlink data channels and the scheduling data of the plurality of downlink control channels may overlap in at least one of time domain and frequency domain.

Alternatively, the scheduling data of the plurality of downlink control channels may be sent by one TRP, and the plurality of downlink data channels may be sent to the terminal device by one TRP. The plurality of downlink data channels and the scheduling data of the plurality of downlink control channels may overlap in at least one of time domain and frequency domain.

A manner of sending the plurality of downlink control channels by one TRP may be further applied to a scenario in which the TRP is configured with a plurality of antenna panels. There is relatively good spatial isolation between the plurality of antenna panels, and the plurality of antenna panels may generate beams with relatively low correlation, so that the plurality of downlink control channels can be sent to the terminal device by using different antenna panels, and interference between the plurality of downlink control channels is relatively small. The beam is an energy accumulation effect presented by a signal in space obtained after a transmit end and/or a receive end adjust and/or adjusts an antenna weight.

Alternatively, a manner of sending the downlink control channel may be flexibly switched between the TRPs. For example, a TRP 1 and a TRP 2 are used as examples. The TRP 1 sends a PDCCH 1, and a PDSCH 1 scheduled by the PDCCH 1 is from the TRP 2. The TRP 2 sends a PDCCH 2, and a PDSCH 2 scheduled by the PDCCH 2 is from the TRP 1. For another example, the TRP 1 sends the PDCCH 1, and the PDSCH 1 scheduled by the PDCCH 1 is from the TRP 1. The TRP 2 sends the PDCCH 2, and the PDSCH 2 scheduled by the PDCCH 2 is from the TRP 2.

It should be understood that a source of a downlink control channel (for example, a PDCCH) or a downlink shared channel (for example, a PDSCH) is not limited in this embodiment of this application. In a standard protocol, the source of the PDCCH or the PDSCH may be related to a large-scale information indication (for example, a TCI indication). A relationship between a downlink control channel and TCI indication information corresponding to the downlink control channel is not limited in this embodiment of this application; and/or a relationship between a downlink shared channel and TCI indication information corresponding to the downlink shared channel is not limited.

Optionally, when same data is transmitted on the plurality of downlink data channels, time-frequency locations, coding versions, and the like corresponding to resources used for data transmission may be different.

S220: The terminal device determines, based on the plurality of downlink data channels, one or more pieces of feedback information corresponding to at least two downlink data channels. The at least two downlink data channels are at least two downlink data channels in the plurality of downlink data channels received by the terminal device.

The terminal device demodulates the plurality of received downlink data channels, and generates feedback information for the demodulated downlink data channels. The feedback information herein may be one or more pieces of feedback information corresponding to the at least two downlink data channels. For example, the at least two downlink data channels correspond to one piece of feedback information, or the at least two downlink data channels correspond to a plurality of pieces of feedback information. In other words, the terminal device may generate feedback information for each of the plurality of downlink data channels, to obtain the plurality of pieces of feedback information, or may jointly generate one piece of feedback information for the plurality of downlink data channels.

For example, the terminal device demodulates the PDSCH 1 to obtain feedback information 1 of the PDSCH 1, and demodulates the PDSCH 2 to obtain feedback information 2 of the PDSCH 2. Optionally, the terminal device may separately send the feedback information 1 and the feedback information 2, or may send the feedback information 1 and the feedback information 2 after processing (for example, joint encoding).

Optionally, the feedback information obtained by the terminal device may be referred to as uplink control information (UCI). A type of the UCI includes HARQ-ACK information, a scheduling request (SR), and channel state information (CSI). Bits of the UCI may include a HARQ-ACK information bit, an SR bit, and a CSI bit. The HARQ-ACK information bit may include HARQ-ACK information indicating one or more pieces of data. The data herein may be a codeword, a transport block, a code block, or a code block group.

The CSI may include a channel quality indicator (CQI), a precoding matrix indicator (PMI), and a CSI-RS resource indicator (CSI-RS resource indicator), a synchronization signal block (SSB) resource indicator (SSBRI), layer indicator (LI) information, a rank indicator (RI), and signal received power (RSRP) information. The RSRP includes an L1-RSRP (Layer-1 RSRP). The synchronization signal block may include a primary synchronization signal (PSS), a secondary synchronization signal (SSS), a broadcast channel (PBCH), and the like. The synchronization signal block may also be referred to as an SS/PBCH block.

S230: The terminal device sends the one or more pieces of feedback information through a same uplink control channel. That is, the one or more pieces of feedback information may be carried on the same uplink control channel.

In this embodiment of this application, the terminal device sends the one or more pieces of feedback information to the network device through the same uplink control channel, and this helps save resources of the terminal device.

Correspondingly, the network device receives the one or more pieces of feedback information. After receiving the feedback information, the network device may determine whether data is successfully transmitted for the first time, to determine whether the data needs to be retransmitted.

When receiving the uplink control channel sent by the terminal device, the network device should avoid a resource conflict with another network device. For example, at a resource location, if the TRP 1 receives a PUCCH independently sent to the TRP 1 by the terminal device, the TRP 2 needs to avoid scheduling, at the resource location, a resource (for example, a PUCCH, a physical uplink share channel (PUSCH), a sounding reference signal (SRS), or a physical random access channel (PRACH)).

For example, the feedback information is UCI. In the conventional technology, the terminal device may use a channel such as the PUCCH or the PUSCH to carry the UCI for transmission. When the UCI is carried on the PUCCH, the UCI information may be generated through sequence generation, sequence modulation, modulation, frequency spread modulation, or the like.

Generating the UCI information through the sequence generation means that the terminal device selects a to-be-used sequence from a candidate sequence set based on the UCI information. The network device determines the feedback information of the terminal device based on the received sequence.

Generating the UCI information through the sequence modulation means that, for a sequence, the UCI information is used as modulation information of the sequence, for example, phase modulation is performed on the sequence by multiplying a UCI information symbol on the sequence.

Generating the UCI information through the modulation means that, like data, the UCI information is scrambled, modulated into symbols, and then mapped.

Generating the UCI information through the frequency spread modulation means that, after the UCI information is scrambled and modulated, the UCI information is multiplied by a spreading code, and then transmitted. Commonly used frequency spread modulation may be a block frequency spread method.

The following describes a sequence generation method by using a PUCCH format 0 as an example. In this embodiment of this application, ACK/NACK feedback information of the terminal device may also use the PUCCH format 0. However, this does not constitute a limitation on this embodiment of this application.

Figure 3:
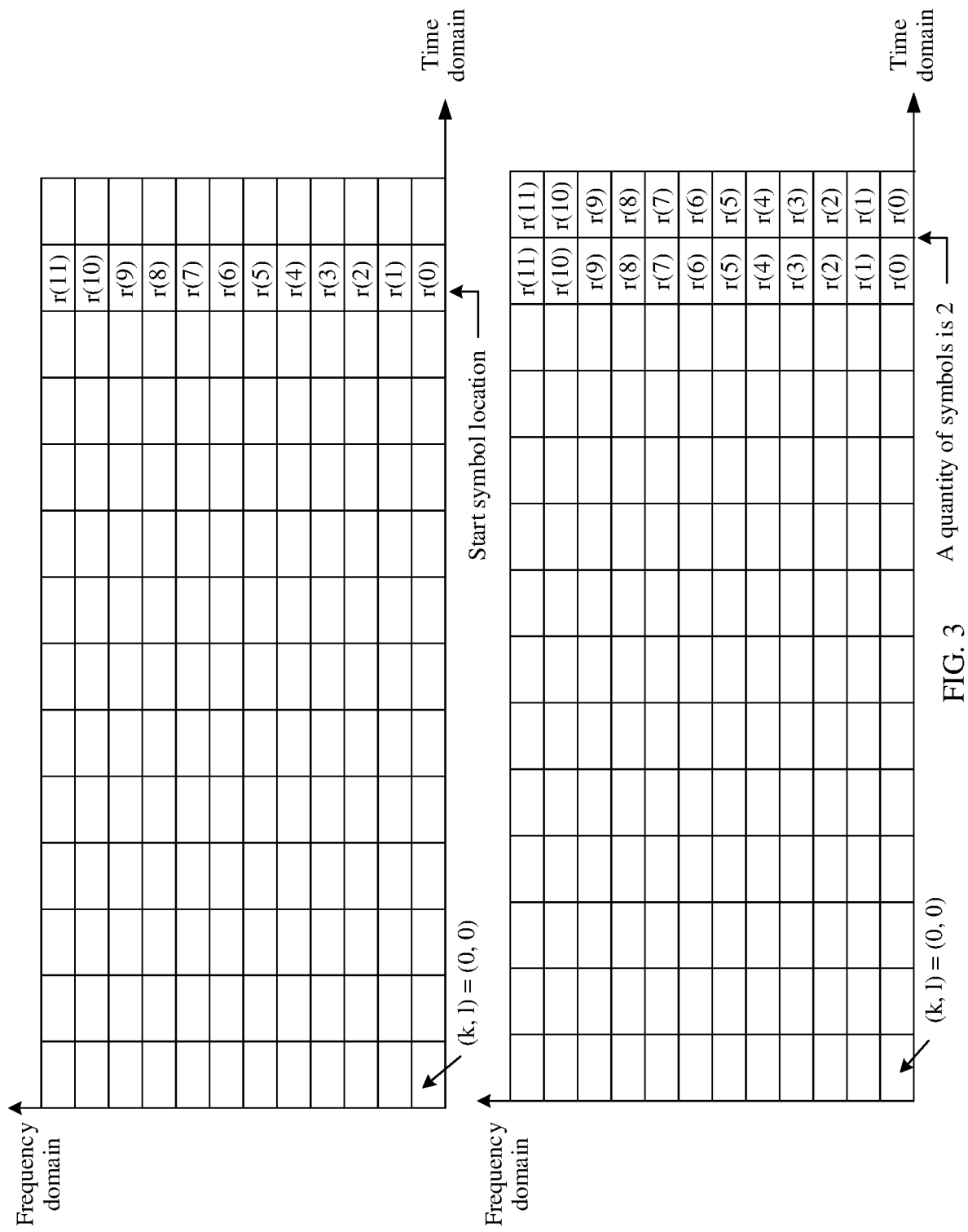
FIG. 3 is a schematic diagram of mapping a sequence to resources according to an embodiment of this application.

Specifically, the terminal device determines the sequence based on the UCI information. A PUCCH carries a sequence, and the sequence is repeatedly mapped to two symbols. FIG. 3 is a schematic diagram of a mapping location of a sequence on resources. As shown in FIG. 3, a start resource location may be represented by (k, l)=(0, 0), where k represents a vertical axis, and l represents a horizontal axis. The horizontal axis indicates the time domain (a corresponding time unit may be a symbol, and 14 symbols are a slot), and an identifier of a time domain location increases from left to right. The vertical axis represents the frequency domain (a corresponding frequency domain unit may be a subcarrier, and 12 subcarriers are a resource block (RB)), and an identifier of a frequency domain location increases from bottom to top. In an upper diagram of FIG. 3, the network device configures a start symbol location of the sequence (for example, the sequence is r(1), r(2), r(3), r(4), r(5), r(6), r(7), r(8), r(9), r(10), and r(11)) by using higher layer signaling. A length of the sequence is a quantity of subcarriers in an RB. The network device may configure the sequence (for example, the sequence is r(i), r(2), r(3), r(4), r(5), r(6), r(7), r(8), r(9), r(10), and r(11)) by using the higher layer signaling, to occupy two symbols. As shown in a lower diagram of FIG. 3, the sequence is mapped to two symbols.

A relationship between the sequence and the UCI may include: a sequence cyclic shift is determined based on the UCI information. A sequence cyclic shift result is determined by an initial cyclic shift, a cyclic shift, or the like, and may also be affected by a frequency hopping factor. The frequency hopping factor includes influence of parameters in time domain (such as a slot and a symbol), frequency domain, and the like. The initial cyclic shift is preconfigured by the network device. The cyclic shift is determined by the UCI information and can be labeled as $m_{cs}$. The cyclic shift result may also be referred to as a sequence phase.

When the HARQ-ACK information is 1-bit information, there is a correspondence between a cyclic shift value and the HARQ-ACK information, as shown in the following Table 3:

TABLE 3

| HARQ-ACK value | 0 | 1 |
|---|---|---|
| sequence cyclic shift | $m_{CS} = 0$ | $m_{CS} = 6$ |

In Table 3, 1 represents an ACK, and 0 represents a NACK. If the HARQ-ACK information is an ACK, the cyclic shift value is $m_{cs}=$: and if the HARQ-ACK information is a NACK, the cyclic shift value is $m_{cs}=6$. It should be understood that Table 3 is merely an example for description, and does not constitute a limitation on this embodiment of this application.

Figure 4:
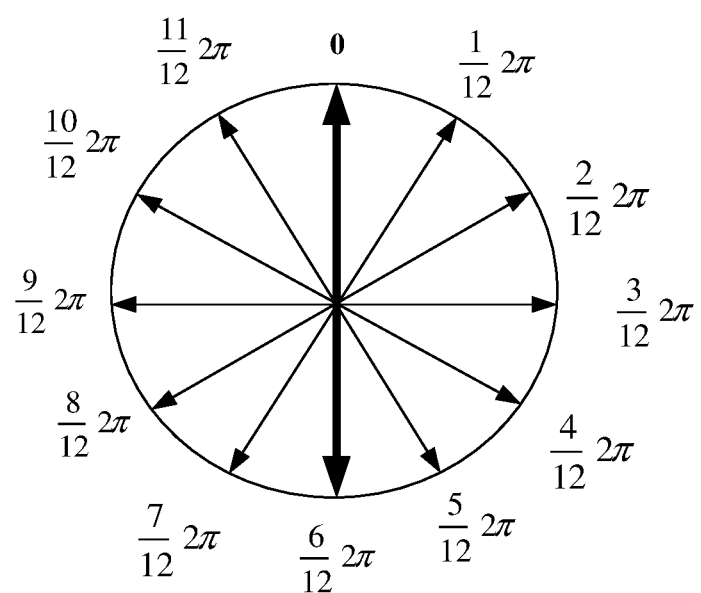
FIG. 4 is a schematic diagram of a phase of a cyclic shift.

FIG. 4 is a schematic diagram of a phase of a cyclic shift. A ring in FIG. 4 is an example of the cyclic shift. For Table 3, phase values that may be taken are 0 and pi. As shown in the table (for example, Table 3 or Table 4), a difference between a phase corresponding to the HARQ-ACK information when the HARQ-ACK information is an ACK and a phase corresponding to the HARQ-ACK information when the HARQ-ACK information is a NACK is a maximum possible difference between two phases. This ensures that a phase difference of sequences corresponding to different HARQ-ACK response results is maximum, so that a possibility that different HARQ-ACK results are incorrectly demodulated is low, and the performance of the feedback information is ensured.

When the HARQ-ACK information is 2-bit information, there is a correspondence between a cyclic shift value and a plurality of pieces of HARQ-ACK information. Details are shown in the following Table 4. In other words, values of two pieces of HARQ-ACK information jointly determine the cyclic shift. The two pieces of HARQ-ACK information may be HARQ-ACK information of two TBs.

TABLE 4

| HARQ-ACK value | {0, 0} | {0, 1} | {1, 1} | {1, 0} |
|---|---|---|---|---|
| sequence cyclic shift | $m_{CS} = 0$ | $m_{CS} = 3$ | $m_{CS} = 6$ | $m_{CS} = 9$ |

In Table 4, if the HARQ-ACK value is {0, 0}, the cyclic shift value is $m_{CS}=0$; if the HARQ-ACK value is {0, 1}, the cyclic shift value is s if the HARQ-ACK value is {1, 1}, the cyclic shift value is 6; and if the HARQ-ACK value is {1, 0}, the cyclic shift value is $m_{CS}=9$ It should be understood that Table 4 is merely an example for description, and does not constitute a limitation on this embodiment of this application.

FIG. 4 is an example of a phase value. A phase difference of cyclic shifts of sequences corresponding to different results of a plurality of HARQ-ACKs is as large as possible, to ensure that different results can be separated widely, so that a possibility of incorrect decoding is low, and the performance of the feedback transmission is ensured. Therefore, four possible HARQ values in Table 4 may uniformly corresponds to phases in [0, 2 pi). For example, the phase values may be (0, 1/2 pi, pi, 3/2 pi), where "pi" is "π".

The foregoing describes how to feed back the 1-bit and 2-bit HARQ information through the PUCCH. To be specific, there is a correspondence between one piece of HARQ information or a combination of a plurality pieces of HARQ information and a sequence cyclic shift of the PUCCH. This affects the PUCCH sequence. The network device attempts to demodulate the PUCCH sequence, to obtain a phase of the PUCCH sequence, and then obtain one or more pieces of HARQ information based on the correspondence. In this embodiment of this application, in a multipoint transmission scenario, a carrying manner of the feedback information may also be described by using an example of the PUCCH format 0.

In this embodiment of this application, the terminal device may determine the carrying manner of the feedback information. Optionally, the method 200 further includes the following operation:

The terminal device determines a carrying manner of the one or more pieces of feedback information on the uplink control channel, where the carrying manner includes any one of the following:

The plurality pieces of feedback information are carried on the uplink control channel, where the uplink control channel includes first indication information, and the first indication information is used to indicate a downlink data channel corresponding to one piece of feedback information in the plurality pieces of feedback information; the plurality of pieces of feedback information are carried on the uplink control channel through joint encoding; or the one or more pieces of feedback information are carried on the uplink control channel through separate encoding, where the one or more pieces of feedback information are separately encoded in a predetermined sequence.

Specifically, the terminal device may use the uplink control channel to carry the one or more pieces of feedback information and additionally carry one or more pieces of first indication information. Each piece of first indication information corresponds to the feedback information, and a one-to-many case is included. The first indication information is used to indicate the downlink data channel corresponding to the feedback information. For example, if the terminal device receives two downlink data channels and generates two pieces of feedback information, the first indication information indicates a downlink data channel corresponding to one of the two pieces of feedback information, and the other piece of feedback information is feedback information corresponding to the other of the two downlink data channels. A first PDSCH and a second PDSCH are used as examples. The terminal device may generate first HARQ-ACK information corresponding to the first PDSCH, and the first HARQ-ACK information may be a 1-bit HARQ-ACK. Similarly, the terminal device may generate second HARQ-ACK information corresponding to the second PDSCH, and the second HARQ-ACK information may be a 1-bit HARQ-ACK. HARQ-ACK information selected and fed back by the terminal device is referred to as the HARQ-ACK information. The first indication information is used to indicate a PDSCH to which the feedback HARQ-ACK information corresponds, that is, indicate whether the HARQ-ACK information corresponds to the first PDSCH or the second PDSCH. Optionally, the first PDSCH and the second PDSCH may be distinguished by using a codeword, a code block, a layer, an antenna port (group), or the like, or a resource identifier of the scheduled PDCCH.

Optionally, the first indication information may be fed back separately through another channel, or may be fed back together with the feedback information (for example, UCI).

In an implementation, if the UCI and the first indication information are jointly encoded, the terminal device may determine a sequence cyclic shift of a PUCCH based on both the HARQ-ACK information and the first indication information. For example, Table 5 provides a relationship between a value of the HARQ-ACK information, a value corresponding to the first indication information, and the sequence cyclic shift of the PUCCH. Details are shown in Table 5 below:

TABLE 5

| HARQ-ACK value | First value | Second value | First value | Second value |
|---|---|---|---|---|
| First indication information | Third Value | | Fourth Value | |
| sequence cyclic shift | First cyclic shift, such as $m_{CS} = 0$ | Second cyclic shift, such as $m_{CS} = 3$ | Third cyclic shift, such as $m_{CS} = 6$ | Fourth cyclic shift, such as $m_{CS} = 9$ |

It should be understood that the cyclic shift values in the second row in Table 5 are merely example descriptions. In practice, another value may be set according to a requirement. The foregoing example constitutes no limitation on this embodiment of this application. In Table 5, values of the cyclic shifts $m_{cs}$ may be 0, 3, 6, and 9. Optionally, the values of the cyclic shift may alternatively be other values. For example, the values of the cyclic shift m cs are {1, 4, 7, 10}, or the values of the cyclic shift $m_{cs}$ are {2, 5, 8, 11}.

In another implementation, some content of the uplink control channel (PUCCH) indicates the HARQ-ACK information, and some content indicates the first indication information. For example, if the PUCCH occupies two symbols, a PUCCH sequence is carried on each symbol, and a cyclic shift of each PUCCH sequence is obtained by mapping based on same HARQ-ACK information. Herein, it may be defined that a sequence of a first symbol corresponds to the HARQ-ACK information, and a sequence of a second symbol corresponds to the first indication information. Specifically, for example, the PUCCH includes a first sequence and a second sequence, and the first sequence and the second sequence respectively correspond to the HARQ-ACK information and the first indication information. Specifically, the HARQ-ACK information and the first indication information are respectively used to determine cyclic shifts of the first sequence and the second sequence.

Figure 5:
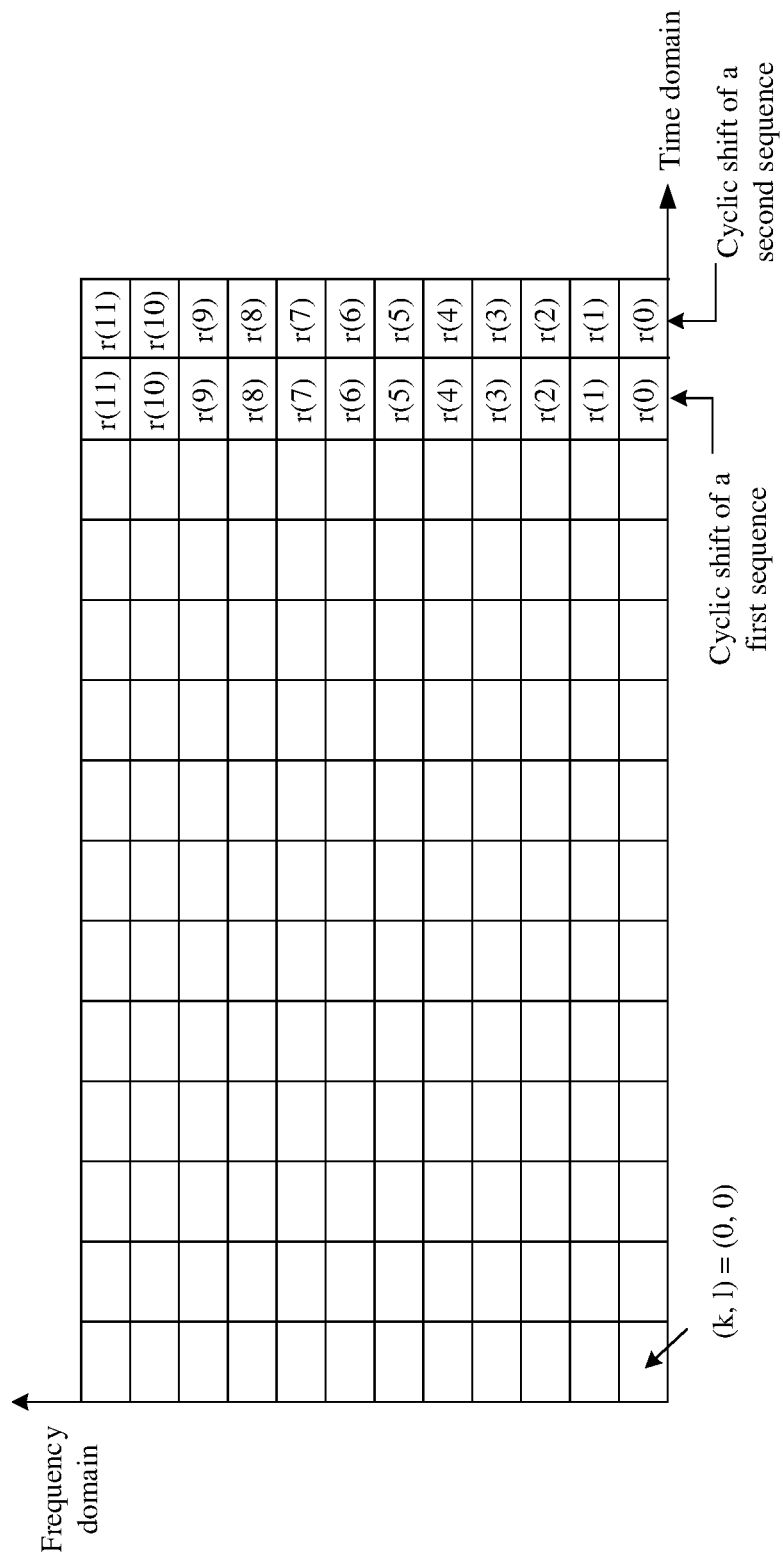
FIG. 5 is an example diagram of mapping sequences to resources according to an embodiment of this application.
Figure 6:
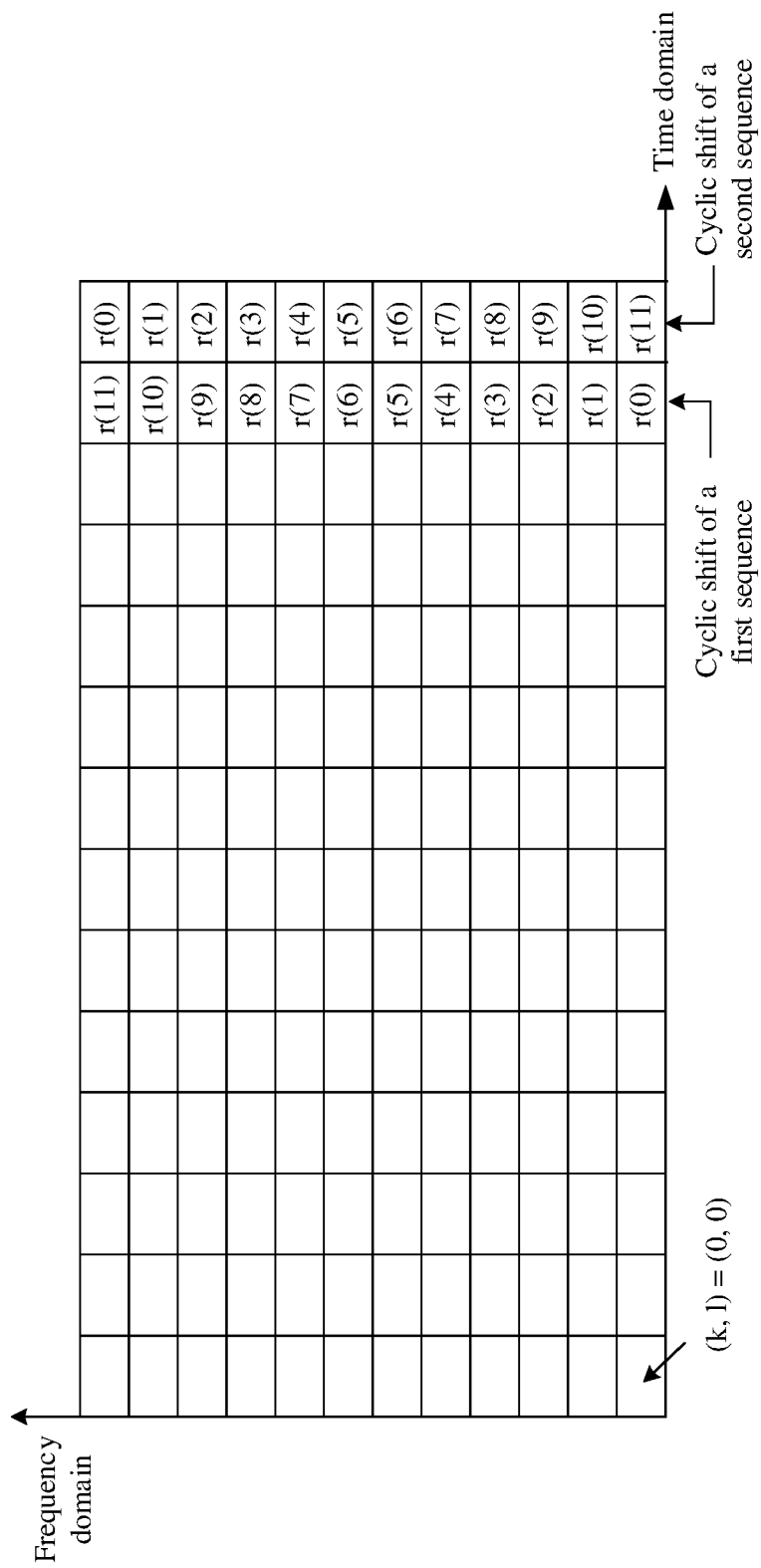
FIG. 6 is another example diagram of mapping sequences to resources according to an embodiment of this application.

Optionally, the first sequence and the second sequence may be mapped to two symbols, or the first sequence and the second sequence may be connected in a cascading manner, and then mapped to a time-frequency resource, so that values with a same number in two sequences can correspond to different subcarriers. The first sequence and the second sequence may be mapped to symbols according to a preset rule. For example, both the first sequence and the second sequence are mapped to the symbols in order (corresponding to FIG. 5), or the first sequence is mapped to the symbols in ascending order, and the second sequence is mapped to the symbols in descending order (corresponding to FIG. 6). The ascending order means that values of k ascend, and the descending order means that values of k descend, where k is a frequency domain unit identifier.

Alternatively, the terminal device may jointly encode the plurality of pieces of feedback information, for example, perform an AND operation, an OR operation, or the like, to generate feedback information less than the plurality of pieces of feedback information.

That the plurality of pieces of feedback information are jointly encoded includes:

The value of each of the plurality of pieces of feedback information is used as an independent variable of a function, and a dependent variable of the function is information actually used for feedback. Specifically, the AND operation on the plurality of pieces of feedback information means: final feedback information=first feedback information and second feedback information . . . , and "and" herein means the AND operation, that is, an AND operator in binary.

Alternatively, the OR operation is performed on the plurality of pieces of feedback information. That is, final feedback information=first feedback information or second feedback information . . . , and "or" herein means the OR operation, that is, an OR operator in binary.

Alternatively, the value of each of the plurality pieces of feedback information jointly determines the feedback information. For example, if each piece of feedback information corresponds to two values, N pieces of feedback information correspond to 2^N (that is, Nth power of 2) values, and the final feedback information of the terminal device is one of 2^N values.

Specifically, the feedback information corresponding to the plurality of downlink data channels (for example, PDSCHs) may jointly determine the sequence of the uplink control channel (for example, the PUCCH).

For example, a first PDSCH and a second PDSCH are used as examples, and the sequence cyclic shift of the PUCCH may be jointly determined based on a value of HARQ-ACK information of the first PDSCH and a value of HARQ-ACK information of the second PDSCH. Table 6 shows a relationship between the value of the HARQ-ACK information and the sequence cyclic shift of the PUCCH. Details are shown in Table 6 below:

TABLE 6

| HARQ-ACK value | {The HARQ-ACK information of the first PDSCH is a first value, and the HARQ-ACK information of the second PDSCH is a first value} | {The HARQ-ACK information of the first PDSCH is a first value, and the HARQ-ACK information of the second PDSCH is a second value} | {The HARQ-ACK information of the first PDSCH is a second value, and the HARQ-ACK information of the second PDSCH is a first value} | {The HARQ-ACK information of the first PDSCH is a second value, and the HARQ-ACK information of the second PDSCH is a second value} |
|---|---|---|---|---|
| sequence cyclic shift | First cyclic shift | Second cyclic shift | Third cyclic shift | Fourth cyclic shift |

An example in Table 6 is given below, as shown in Table 7.

TABLE 7

| HARQ-ACK value | {The HARQ-ACK of the first PDSCH = 1, and the HARQ-ACK of the second PDSCH = 1} | {The HARQ-ACK of the first PDSCH = 1, and the HARQ-ACK of the second PDSCH = 0} | {The HARQ-ACK of the first PDSCH = 0, and the HARQ-ACK of the second PDSCH = 1} | {The HARQ-ACK of the first PDSCH = 0, and the HARQ-ACK of the second PDSCH = 0} |
|---|---|---|---|---|
| sequence cyclic shift | $m_{CS} = 0$ | $m_{CS} = 3$ | $m_{CS} = 6$ | $m_{CS} = 9$ |

It should be understood that cyclic shift values in the second row in Table 7 are merely examples for description. In practice, different values may be selected according to a requirement. The foregoing example constitutes no limitation on this embodiment of this application. For example, in Table 7, the values of the cyclic shift $m_{cs}$ are 0, 3, 6, and 9. Optionally, the values of the cyclic shift may alternatively be {1, 4, 7, 10}, {2, 5, 8, 11}, or the like.

Alternatively, the terminal device may separately encode the one or more pieces of feedback information in a first sequence. For example, the terminal device uses the uplink control channel to carry the plurality of pieces of feedback information in a cascading manner, or separately maps the plurality of pieces of feedback information to different symbols. Optionally, the first sequence may be obtained based on one or more of identifiers such as a codeword identifier, a transport block identifier, a layer identifier, a DMRS port number, an antenna port (group) identifier, or a quasi-co-location indication identifier. This is not specifically limited. The predetermined sequence is used to determine the downlink data channel corresponding to the feedback information, for example, feedback information corresponding to the first PDSCH, and feedback information corresponding to the second PDSCH. The quasi-co-location indication identifier may be an identifier of a TCI state indicated by a quasi-co-location indication field (TCI) in the DCI.

When the plurality of pieces of feedback information are fed back jointly, a sequence may also be determined. The sequence herein is a correspondence between a combination of values of the plurality of pieces of feedback information and the fed back information. For example, a feedback result of the HARQ of the first PDSCH and the HARQ of the second PDSCH is (1, 0) and a feedback result of the HARQ of the first PDSCH and the HARQ of the second PDSCH is (0, 1) are different feedback results. Therefore, it is needed to define, in the feedback results, that 1 refers to (feedback information of) a PDSCH, and 0 refers to (feedback information of) a PDSCH. At least one of the first sequences may also be applied to the sequence when the plurality of pieces of feedback information are jointly fed back.

Optionally, the method 200 further includes the following operations:

The terminal device determines a first downlink control channel from the plurality of downlink control channels based on time domain resources or frequency domain resources on which the downlink control channels are located, or aggregation levels of the downlink control channels; and the terminal device determines the transmission resource based on resource indication information carried on the first downlink control channel, where the resource indication information indicates the transmission resource used to transmit the uplink control channel; and that the terminal device sends an uplink control channel includes:

The terminal device sends the uplink control channel through the transmission resource.

Specifically, before sending the one or more pieces of feedback information through the same uplink control channel, the terminal device may first determine the transmission resource, to send the uplink control channel on the transmission resource. Each of the plurality of downlink control channels includes the resource indication information of the uplink control channel. The terminal device may select a downlink control channel from the plurality of downlink control channels, for example, the first downlink control channel, and determine, by using the resource indication information carried on the first downlink control channel, a resource for transmitting the uplink control channel.

In this embodiment of this application, information about the transmission resource may include other information related to the transmission resource, such as a sequence and a resource identifier of the uplink control channel. This is not limited.

A manner of determining the first downlink control channel is described herein. The terminal device may determine the first downlink control channel from the plurality of downlink control channels based on the time domain resources or the frequency domain resources on which the downlink control channels are located, or the aggregation levels of the downlink control channels, where a resource index corresponding to a time domain resource on which the first downlink control channel is located is largest in resource indexes corresponding to the time domain resources on which the plurality of downlink control channels are located; or a resource index corresponding to a frequency domain resource on which the first downlink control channel is located is smallest in resource indexes corresponding to the frequency domain resources on which the plurality of downlink control channels are located; or a resource aggregation level of the first downlink control channel is highest in resource aggregation levels of the plurality of downlink control channels.

Optionally, the terminal device may determine whether a resource index corresponding to a time domain resource on which a downlink control channel is located is largest or smallest in the following manner: (1) based on a time sequence of time resources occupied by search spaces on which detected downlink control channels are located, determining a size relationship between the resource indexes corresponding to the plurality of downlink control channels; (2) based on a predefined sequence of at least one time domain symbol on which the downlink control channels are located, determining the size relationship between the resource indexes corresponding to the plurality of downlink control channels. For example, if it is defined that an index value corresponding to the first time domain symbol in a plurality of time domain symbols is smallest, and the time domain symbol on which the downlink control channel is located is the first time domain symbol, the terminal device may select the first downlink control channel to determine the transmission resource. Alternatively, if it is defined that an index value corresponding to the first time domain symbol in a plurality of time domain symbols is largest, and the time domain symbol on which the downlink control channel is located is the first time domain symbol, the terminal device may select the first downlink control channel to determine the transmission resource. Alternatively, if it is defined that an index value corresponding to the last time domain symbol in a plurality of time domain symbols is smallest, and the time domain symbol on which the downlink control channel is located is the last time domain symbol, the terminal device may select the first downlink control channel to determine the transmission resource. Alternatively, if it is defined that an index value corresponding to the last time domain symbol in a plurality of time domain symbols is largest, and the time domain symbol on which the downlink control channel is located is the last time domain symbol, the terminal device may select the first downlink control channel to determine the transmission resource.

If interleaving is not performed, the terminal device selects the first downlink control channel based on a quantity of control channel elements CCEs corresponding to each of the plurality of downlink control channels. If interleaving is performed, the terminal device selects the first downlink control channel based on a resource index value corresponding to the frequency domain resource corresponding to each of the plurality of downlink control channels. The interleaving is a common encoding method, and may be used to mitigate impact of a burst error. Generally, data before and after interleaving does not change, but a sequence of the data changes.

Optionally, the terminal device may determine, based on information carried on the downlink control channels, a downlink control channel that is to be selected to determine the transmission resource. For example, two downlink control channels are used as examples. When CWs indicated by the two downlink control channels are different, the transmission resource is determined based on the downlink control channel of CW0; or when CWs indicated by the two downlink control channels are different, the transmission resource is determined based on the downlink control channel with a larger MCS; or when CWs indicated by the two downlink control channels are the same, the transmission resource is determined based on the downlink control channel with a smaller RV version; or when both the two downlink control channels include indication information (for example, a PUCCH resource indicator), the terminal device selects a PUCCH resource that occupies more time domain symbols in indicated PUCCH resources (or indicated PUCCH resources corresponding to the indicator) as the transmission resource.

In another implementation, the terminal device may determine a plurality of transmission resources based on the plurality of downlink control channels, and then select one of the transmission resources for transmission. The terminal device only needs to select one of the transmission resources for transmission when one or more of the following is met:

Transmission resources of two PUCCHs overlap, and a transmit power the overlapping part exceeds a maximum transmit power, where the overlapping is overlapping in time domain; some or all time domain symbols of two transmission resources overlap; or two transmission resources are in a same slot, and a quantity of symbols occupied by each of the two transmission resources is greater than or equal to 3 (the PUCCH includes a PUCCH transmitted through a long symbol and a PUCCH transmitted through a short symbol, and if the quantity of symbols greater than or equal to 3 is used to indicate that the long symbol PUCCH is transmitted in this case, overlapping may occur).

Optionally, the terminal device may perform the following selection from the plurality of transmission resources based on any one of the following rules: selecting a transmission resource that occupies more symbols; selecting a transmission resource with a lower power; or selecting a transmission resource based on HARQ-ACK information.

Optionally, before the one or more network devices send a downlink data channel to the terminal device, the one or more network devices send, to the terminal device, a downlink control channel, for example, a physical downlink control channel PDCCH. One or more network devices may send the plurality of downlink control channels to the terminal device by using same or different resources (the resources may be time domain resources, frequency domain resources, or code domain resources). Optionally, the plurality of downlink control channels are orthogonal in time domain, the time domain resources do not overlap, and the frequency domain resources may overlap or may not overlap. Alternatively, the plurality of downlink control channels are orthogonal in frequency domain, the frequency domain resources do not overlap, and the time domain resources may overlap or may not overlap.

Optionally, the plurality of downlink control channels may be in different search spaces (search space), or may be in a same search space. This is not limited. Optionally, time domain indications corresponding to the search spaces on which the plurality of downlink control channels are located may not overlap. For example, one or more of periods, offsets, durations, and time domain detection patterns of the search spaces on which the downlink control channels are located are different.

Optionally, the plurality of downlink control channels may belong to different CORESETs, or may occupy a same CORESET. This is not limited. In a case in which the plurality of downlink control channels belong to different CORESETs, each CORESET may have its own number or identifier.

When a plurality of network devices send the plurality of downlink control channels to the terminal device, the plurality of downlink control channels may be associated with one or more of the following: different CORESETs, different search spaces, or different PDCCH candidate (candidate) locations.

The plurality of downlink control channels may be indicated by using different quasi-co-locations. When the plurality of downlink control channels are indicated by using different quasi co-locations, the plurality of downlink control channels may be implemented by occupying different CORESETs, or may be implemented by occupying one CORESET. This is not limited. Correspondingly, the terminal device may receive the plurality of downlink control channels by using a plurality of quasi co-location indications. Herein, the terminal device may have quasi-co-location assumptions of different downlink control channels. Therefore, downlink control information DCI carried by the plurality of downlink control channels includes TCI indication information. Optionally, the plurality of quasi co-location indications may further correspond to a plurality of search spaces in one CORESET. This is not limited.

The plurality of downlink control channels may be scrambled by different DMRS scrambling sequences, so that interference from the plurality of downlink control channels of the plurality of network devices is randomized.

Precoding granularities of the plurality of downlink control channels may be the same or different. When the plurality of downlink control channels belong to a CORESET, the network device may indicate a time domain precoding granularity or a frequency domain precoding granularity of a CORESET, or the network device may further indicate a time domain coding granularity and a frequency domain coding granularity of a CORESET. When the time domain precoding granularity of a CORESET is less than a time domain length of a possible downlink control channel, different downlink control channels may correspond to different time domain precoding granularities; or when the frequency domain precoding granularity of a CORESET is less than a frequency domain length of a possible downlink control channel, different downlink control channels may correspond to different frequency domain precoding granularities.

The plurality of downlink control channels may correspond to different frequency domain locations. In the conventional technology, a plurality of search spaces correspond to a same frequency domain location. In this embodiment of this application, a frequency domain location corresponding to a CORESET may correspond to different search spaces. In other words, the plurality of search spaces correspond to different frequency domain locations. If the plurality of downlink control channels correspond to the plurality of search spaces, the plurality of downlink control channels correspond to different frequency domain locations.

In the foregoing description, different CORESET identifiers may correspond to different $Y_{p,n_s,f}^\mu$. If CORESET identifiers of the plurality of downlink control channels are the same, results of performing modulo operations on a specific parameter by the CORESET identifiers are also the same, and $Y_{p,n_s,f}^\mu$ corresponding to the plurality of downlink control channels are also the same. To avoid this case, processing may be performed according to the following principle: When the plurality of downlink control channels correspond to different CORESETs, different CORESET identifiers are allocated to different CORESETs corresponding to the plurality of downlink control channels. In this way, different CORESET identifiers have different results of modulo operations on a first constant. For example, identifiers of CORESETs on which the plurality of downlink control channels are located have different results of the modulo operations on the first constant. The modulo operation may also be referred to as a remainder operation. The first constant is determined by a maximum total quantity of possible CORESETs of the terminal device. The first constant may be 1, 2, or 3.

For the terminal device, a manner for the terminal device to receive the plurality of downlink control channels may be: the terminal device performs blind detection on at least one downlink control channel of the plurality of downlink control channels. For example, the terminal device performs blind detection on the plurality of downlink control channels. Alternatively, the terminal device performs blind detection on some of the plurality of downlink control channels, and obtains remaining downlink control channels by using related information, where the related information is preconfigured information or predefined information, or may be related information of the detected downlink control channel. Alternatively, the terminal device obtains some downlink control channels through blind detection, and the terminal device needs to perform blind detection with reference to related information to obtain other downlink control channels.

Specifically, for example, when the terminal device detects a downlink control channel, and detection stop condition is not met, the terminal device continues to detect other downlink control channels. The detection stop condition may be determined based on one or more of the following: All search spaces or CORESETs that need to be searched are searched, a maximum quantity of search times is reached, and the like. The terminal device may detect an undetected downlink control channel by using related information of a detected downlink control channel. For example, assuming that aggregation levels of the plurality of downlink control channels are the same, the terminal device may continue to detect the downlink control channel in a candidate resource by using an aggregation level corresponding to the detected downlink control channel. In this way, a possibility of the aggregation level attempted by the terminal device when detecting the downlink control channel can be reduced. This reduces complexity of the blind detection.

The preconfigured information is information used to detect the downlink control channel. For example, the network device may configure information, such as a time-frequency location on which the at least one downlink control channel is located, for the terminal device, so that the terminal device can detect the downlink control channel based on the information configured by the network device.

The predefined information is information of the downlink control channel preset in protocols. For example, it may be specified that at least one downlink control channel appears only at some fixed time-frequency resource locations.

The blind detection means that before successfully receiving the downlink control channel, the terminal device does not know a specific location of the downlink control channel, and needs to detect, in a specific resource range (for example, at least one candidate PDCCH resource), whether the downlink control channel exists. The at least one candidate PDCCH resource may be understood as a search space set of the PDCCH, and includes a common search space set and a terminal device-specific search space set. The terminal device may detect DCI in the search space set.

The plurality of downlink control channels are terminal device-specific downlink control channels, rather than common downlink control channels. A quantity of times that the terminal device needs to perform blind detection is a sum of a quantity of PDCCH candidates that need to be detected in a common search space and a quantity of terminal device-specific PDCCH candidates that need to be detected from the plurality of network devices.

It should be understood that the examples in FIG. 3 to FIG. 6 are provided merely for helping a person skilled in the art understand the embodiments of this application, instead of limiting the embodiments of this application to specific scenarios shown in the examples. A person skilled in the art may apparently make various equivalent modifications or changes according to the examples shown in FIG. 3 to FIG. 6, and such modifications or changes also fall within the scope of the embodiments of this application.

It should be further understood that the solutions in the embodiments of this application may be properly combined, and explanations or descriptions of the terms in the embodiments may be cited or explained in the embodiments. This is not limited in this application.

It should be further understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing describes in detail the information transmission method according to the embodiments of this application with reference to FIG. 1 to FIG. 6. The following describes an information transmission apparatus according to the embodiments of this application with reference to FIG. 7 to FIG. 9. It should be understood that the technical features described in the method embodiments are also applicable to the following apparatus embodiments.

Figure 7:
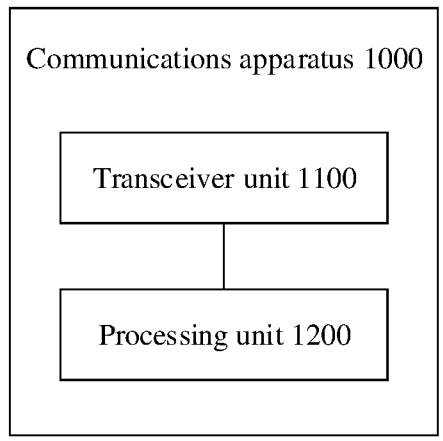
FIG. 7 is a schematic block diagram of a communications apparatus according to an embodiment of this application.

FIG. 7 is a schematic block diagram of a communications apparatus according to an embodiment of this application. As shown in FIG. 7, the communications apparatus 1000 may include a transceiver unit 1100 and a processing unit 1200.

In a possible design, the communications apparatus 1000 may correspond to the terminal device in the foregoing method embodiments, for example, may be the terminal device, or may be a chip disposed in the terminal device.

Specifically, the communications apparatus 1000 may correspond to the terminal device in the method 200 according to the embodiments of this application. The communications apparatus 1000 may include units configured to perform the method performed by the terminal device in the method 200 in FIG. 2. In addition, the units in the communications apparatus 1000 and the foregoing other operations and/or functions are separately used to implement corresponding procedures of the terminal device in the method 200 in FIG. 2.

In an implementation, the transceiver unit 1100 and the processing unit 1200 may be configured to perform the following operations:

The transceiver unit 1100 is configured to receive a plurality of downlink data channels, where the plurality of downlink data channels are scheduled through a plurality of downlink control channels; the processing unit 1200 is configured to determine, based on the plurality of downlink data channels, one or more pieces of feedback information corresponding to at least two downlink data channels; and the transceiver unit 1100 is further configured to send the one or more pieces of feedback information through a same uplink control channel.

In a possible implementation, the processing unit 1200 is further configured to: determine a carrying manner of the one or more pieces of feedback information on the uplink control channel, where the carrying manner includes any one of the following: one or more pieces of feedback information are carried on the uplink control channel, where the uplink control channel includes first indication information, and the first indication information is used to indicate a downlink data channel corresponding to one piece of feedback information in the one or more pieces of feedback information; the plurality of pieces of feedback information are carried on the uplink control channel through joint encoding; or the one or more pieces of feedback information are carried on the uplink control channel through separate encoding, where the one or more pieces of feedback information are separately encoded in a predetermined sequence.

In a possible implementation, the processing unit 1200 is further configured to: determine a first downlink control channel from the plurality of downlink control channels based on time domain resources or frequency domain resources on which the plurality of downlink control channels are located, or aggregation levels of the plurality of downlink control channels; and determine the transmission resource based on resource indication information carried on the first downlink control channel, where the resource indication information indicates the transmission resource used to transmit the uplink control channel.

The transceiver unit 1100 is further configured to send the uplink control channel through the transmission resource.

Optionally, the first downlink control channel is a downlink control channel with a largest resource index in the plurality of downlink control channels, and the resource index is an index of a time domain resource on which the downlink control channel is located; or the first downlink control channel is a downlink control channel with a smallest resource index in the plurality of downlink control channels, and the resource index is an index of a frequency domain resource on which the downlink control channel is located; or the first downlink control channel is a downlink control channel with a highest resource aggregation level index in the plurality downlink control channels, and the resource aggregation level index is an index of a resource aggregation level of the downlink control channel.

Optionally, the plurality of downlink data channels are scheduled for the apparatus by a same network device or a plurality of different network devices.

Optionally, data transmitted on each downlink data channel of the plurality of downlink data channels is same or different data in a same codeword of a same transport block; same or different data in different codewords of a same transport block; or data in different transport blocks.

It should be understood that a specific process in which each unit performs the foregoing corresponding operation is described in detail in the foregoing method embodiments. For brevity, details are not described herein again.

Figure 8:
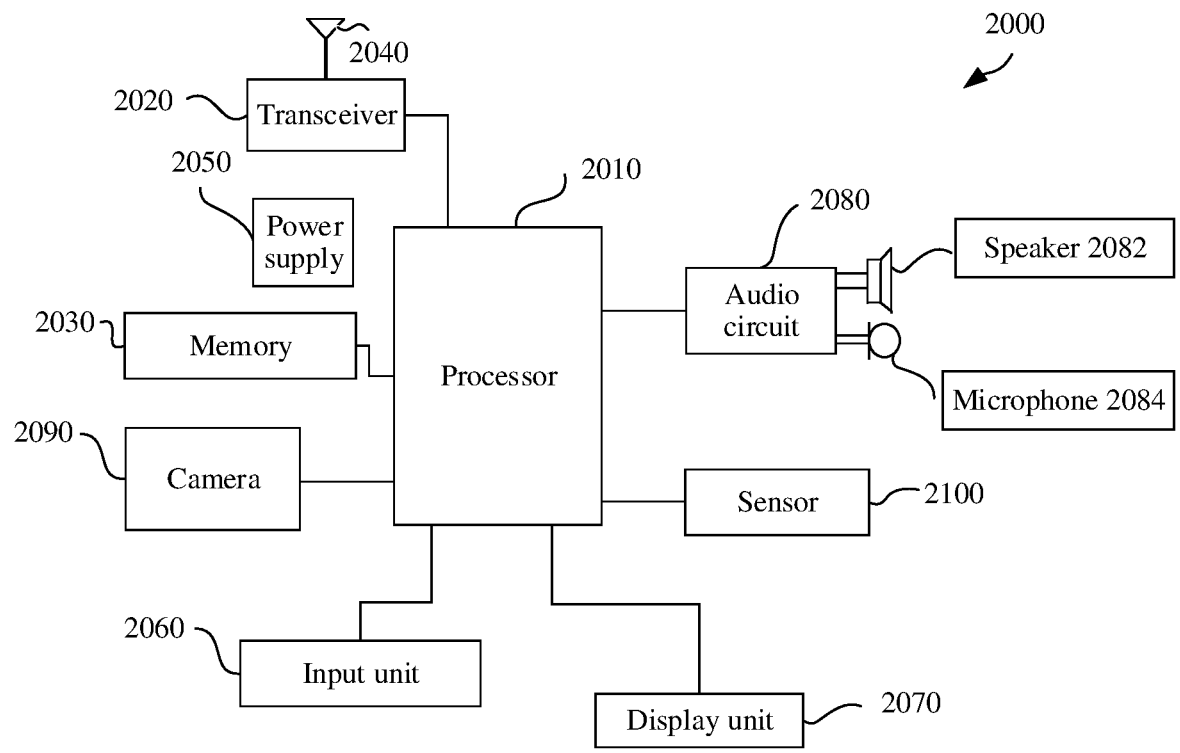
FIG. 8 is a schematic structural diagram of a terminal device according to an embodiment of this application.

It should be further understood that when the communications apparatus 1000 is the terminal device, the transceiver unit 1100 in the communications apparatus 1000 may correspond to a transceiver 2020 in a terminal device 2000 shown in FIG. 8, and the processing unit 1200 in the communications apparatus 1000 may correspond to a processor 2010 in the terminal device 2000 shown in FIG. 8.

It should be further understood that when the communications apparatus 1000 is a chip disposed in the terminal device, the transceiver unit 1100 in the communications apparatus 1000 may be an input/output interface.

In another possible design, the communications apparatus 1000 may correspond to the network device in the foregoing method embodiments, for example, may be the network device, or a chip disposed in the network device.

Specifically, the communications apparatus 1000 may correspond to the network device in the method 200 according to the embodiments of this application. The communications apparatus 1000 may include units configured to perform the method performed by the network device in the method 200 in FIG. 2. In addition, the units in the communications apparatus 1000 and the foregoing other operations and/or functions are separately used to implement corresponding procedures of the method 200 in FIG. 2.

In an implementation, the transceiver unit 1100 and the processing unit 1200 may be configured to perform the following operations:

The transceiver unit 1100 is configured to send one or more downlink data channels to a terminal device; the transceiver unit 1100 is further configured to receive one or more pieces of feedback information sent by the terminal device through a same uplink control channel; and the processing unit 1200 is configured to decode the one or more pieces of feedback information to determine feedback information corresponding to the one or more downlink data channels.

In a possible implementation, the uplink control channel includes one or more pieces of first indication information, and the first indication information is used to indicate a downlink data channel corresponding to one piece of feedback information in the one or more pieces of feedback information.

That the processing unit 1200 is configured to decode the one or more pieces of feedback information, and determine feedback information corresponding to the one or more downlink data channels specifically includes: determining, based on the one or more pieces of first indication information, one or more pieces of feedback information corresponding to the one or more downlink data channels.

In a possible implementation, the plurality of pieces of feedback information are carried on the uplink control channel through joint encoding.

That the processing unit 1200 is configured to decode the one or more pieces of feedback information, and determine feedback information corresponding to the one or more downlink data channels specifically includes: decoding the plurality of pieces of feedback information that are jointly encoded, to determine one or more pieces of feedback information corresponding to the one or more downlink data channels.

In a possible implementation, the one or more pieces of feedback information are carried on the uplink control channel through separate coding, and the one or more pieces of feedback information are separately encoded in a predetermined sequence.

That the processing unit 1200 is configured to decode the one or more pieces of feedback information, and determine feedback information corresponding to the one or more downlink data channels specifically includes: decoding the one or more pieces of feedback information that are separately encoded; and determining the one or more pieces of feedback information corresponding to the one or more downlink data channels based on a predetermined sequence.

In a possible implementation, the transceiver unit 1100 is further configured to send one or more downlink control channels to the terminal device, where each downlink control channel carries a corresponding time domain resource, frequency domain resource, or resource aggregation level.

Figure 9:
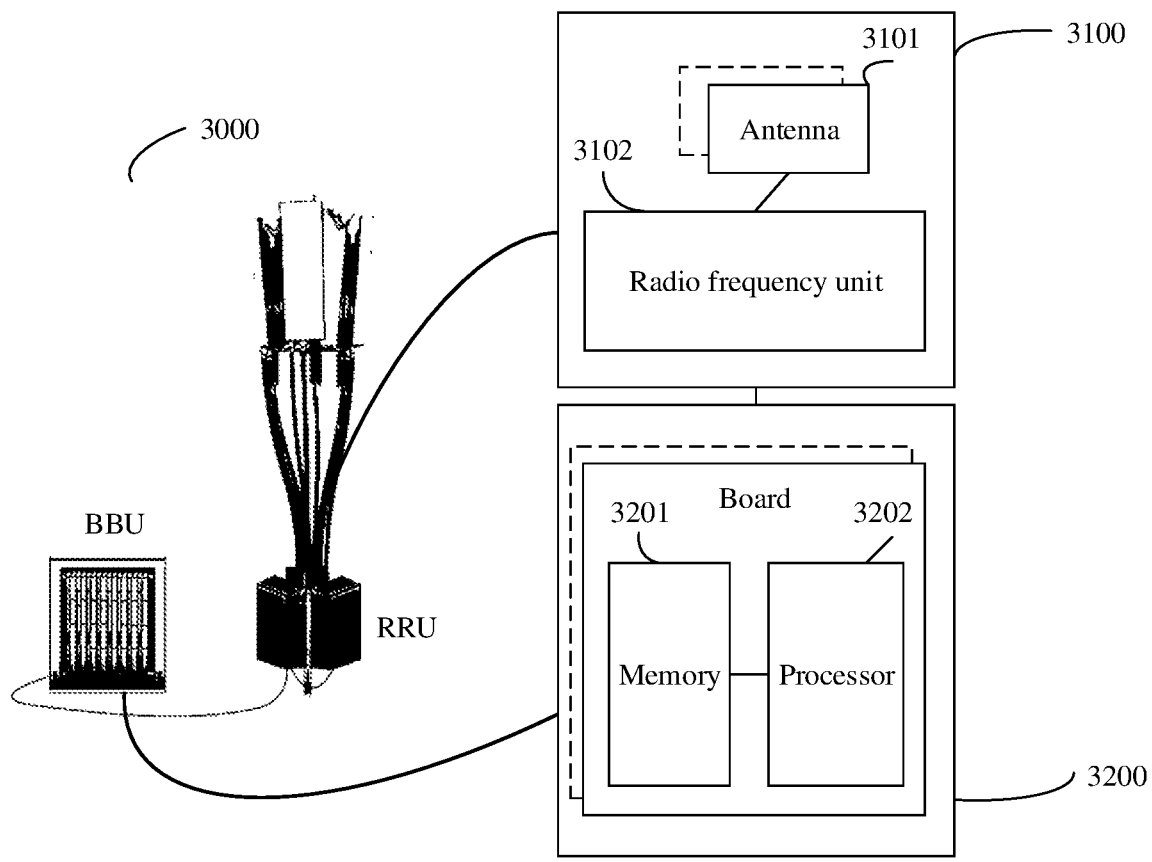
FIG. 9 is a schematic structural diagram of a network device according to an embodiment of this application.

It should be further understood that when the communications apparatus 1000 is the network device, a communications unit in the communications apparatus 1000 may correspond to a transceiver 3200 in a network device 3000 shown in FIG. 9, and the processing unit 1200 in the communications apparatus 1000 may correspond to a processor 3202 in the network device 3000 shown in FIG. 9.

It should be further understood that when the communications apparatus 1000 is a chip disposed in the network device, the transceiver unit 1100 in the communications apparatus 1000 may be an input/output interface.

FIG. 8 is a schematic structural diagram of a terminal device 2000 according to an embodiment of this application. The terminal device 2000 may be applied to the system shown in FIG. 1, to perform functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke and run the computer program in the memory 2030, to control the transceiver 2020 to receive or send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may also be integrated into the processor 2010, or may be independent of the processor 2010. The processor 2010 may correspond to the processing unit in FIG. 7.

The transceiver 2020 may correspond to the communications unit in FIG. 7, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 8 may implement processes related to the terminal device in the method embodiment shown in FIG. 2. Operations and/or functions of modules in the terminal device 2000 are separately intended to implement corresponding procedures in the foregoing method embodiments.

For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050 that is configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 9 is a schematic structural diagram of a network device according to an embodiment of this application, for example, may be a schematic structural diagram of a base station. The base station 3000 may be applied to the system shown in FIG. 1, to perform functions of the network device in the foregoing method embodiments. As shown in the figure, the base station 3000 may include one or more radio frequency units, for example, one or more remote radio units (RRU) 3100, and one or more baseband units (BBU) (which may also be referred to as distributed units (DU)) 3200. The RRU 3100 may be referred to as a transceiver unit, and corresponds to the transceiver unit 1100 in FIG. 7. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to receive and send a radio frequency signal, and perform conversion between the radio frequency signal and a baseband signal, for example, configured to send configuration information reported by a CSI to a terminal device. The BBU 3200 is mainly configured to: perform baseband processing, control the base station, and so on. The RRU 3100 and the BBU 3200 may be physically disposed together, or may be physically disposed separately; to be specific, the base station is a distributed base station.

The BBU 3200 is a control center of the base station, and may be referred to as a processing unit, may correspond to the processing unit 1200 in FIG. 7, and is mainly configured to implement a baseband processing function, for example, channel encoding, multiplexing, modulation, or frequency spread. For example, the BBU (the processing unit) may be configured to control the base station to perform operation procedures related to the network device in the foregoing method embodiments, for example, to generate the configuration information reported by the CSI.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and necessary data. The processor 3202 is configured to control the base station to perform a necessary action, for example, configured to control the base station to perform an operation procedure related to the network device in the foregoing method embodiments. The memory 3201 and the processor 3202 may serve one or more boards. In other words, a memory and a processor may be independently disposed on each board, or the plurality of boards may share a same memory and a same processor. In addition, a necessary circuit may be further disposed on each board.

It should be understood that the base station 3000 shown in FIG. 9 may implement processes related to the network device in the method embodiment in FIG. 2. Operations and/or functions of modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

According to the methods provided in the embodiments of this application, this application further provides a computer program product. The computer program product includes computer program code. When the computer program code is run on a computer, the computer is enabled to perform the method in the embodiment shown in FIG. 2.

According to the methods provided in the embodiments of this application, this application further provides a computer-readable medium. The computer-readable medium stores program code. When the program code is run on a computer, the computer is enabled to perform the method in the embodiment shown in FIG. 2.

According to the methods provided in the embodiments of this application, this application further provides a system. The system includes the foregoing one or more terminal devices and the foregoing one or more network devices.

The embodiments of this application further provide a processing apparatus including a processor and an interface. The processor is configured to perform the communications method in any one of the foregoing method embodiments.

It should be understood that, the processing apparatus may be a chip. For example, the processing apparatus may be a field programmable gate array (FPGA), or may be a general purpose processor, a digital signal processor (DSP), an application specific integrated circuit (ASIC), a field programmable gate array (FPGA) or another programmable logic device, a discrete gate or transistor logic device, a discrete hardware component, may be a system on chip (SoC), may be a central processing unit (CPU), may be a network processor (NP), may be a digital signal processor (digital signal processor, DSP), may be a micro controller unit (MCU), and may be a programmable logic device (PLD) or another integrated chip. The processor may implement or perform the methods, operations, and logical block diagrams that are disclosed in the embodiments of this application. The general-purpose processor may be a microprocessor, or the processor may be any conventional processor, or the like. The operations of the methods disclosed with reference to the embodiments of this application may be directly performed and completed by a hardware decoding processor, or may be performed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the systems and methods described in this specification include but are not limited to these memories and any memory of another suitable type.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer instructions are loaded and executed on the computer, the procedure or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device and the terminal device in the method embodiments. A corresponding module or unit performs a corresponding operation. For example, the communication unit (transceiver) performs a receiving or sending operation in the method embodiments, and an operation other than the sending operation and the receiving operation may be performed by the processing unit (processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local or remote process, for example, based on a signal having one or more data packets (for example, data from two components interacting with another component in a local system, a distributed system, or across a network such as the internet interacting with other systems by using the signal).

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
receiving, by a terminal device, a plurality of downlink data channels, the plurality of downlink data channels being scheduled through a plurality of downlink control channels;
determining, by the terminal device, based on the plurality of downlink data channels, one or more pieces of feedback information corresponding to at least two of the plurality of downlink data channels;
sending, by the terminal device, the one or more pieces of feedback information through a same uplink control channel;
determining, by the terminal device, a first downlink control channel from the plurality of downlink control channels based on time domain resources or frequency domain resources on which the plurality of downlink control channels are located, or aggregation levels of the plurality of downlink control channels;
determining, by the terminal device, a transmission resource based on resource indication information carried on the first downlink control channel, wherein the resource indication information indicates the transmission resource used to transmit the uplink control channel; and
sending, by the terminal device, the uplink control channel through the transmission resource, wherein:
the first downlink control channel is a downlink control channel with a largest resource index in the plurality of downlink control channels, and the resource index is an index of a time domain resource on which the downlink control channel is located, or
the first downlink control channel is a downlink control channel with a smallest resource index in the plurality of downlink control channels, and the resource index is an index of a frequency domain resource on which the downlink control channel is located, or
the first downlink control channel is a downlink control channel with a highest resource aggregation level index in the plurality of downlink control channels, and the resource aggregation level index is an index of a resource aggregation level of the downlink control channel.

2. The method according to claim 1, further comprising:
determining, by the terminal device, a carrying manner of the one or more pieces of feedback information on the uplink control channel, wherein the carrying manner comprises:
the one or more pieces of feedback information are carried on the uplink control channel, the uplink control channel comprising first indication information for indicating a downlink data channel corresponding to one piece of feedback information in the one or more pieces of feedback information;
the one or more pieces of feedback information are carried on the uplink control channel through joint encoding; or
the one or more pieces of feedback information are carried on the uplink control channel through separate encoding, wherein the one or more pieces of feedback information are separately encoded in a predetermined sequence.

3. The method according to claim 2, wherein after the one or more pieces of feedback information are separately encoded in the predetermined sequence, the carrying manner further comprises:
the one or more pieces of feedback information are carried on the uplink control channel in a cascading manner; or
the one or more pieces of feedback information are mapped to different symbols.

4. The method according to claim 2, wherein the predetermined sequence is determined based on: a codeword identifier, a transport block identifier, a layer identifier, a number of a demodulation reference signal (DMRS) port, an antenna port identifier, or a quasi-co-location indication identifier.

5. The method according to claim 1, wherein the plurality of downlink data channels are scheduled for the terminal device by a same network device or a plurality of different network devices.

6. The method according to claim 1, wherein the plurality of downlink data channels are distinguished based on a resource of a downlink control channel scheduled by a network device.

7. The method according to claim 1, wherein the plurality of downlink control channels are sent by a plurality of network devices, and the plurality of downlink control channels are associated with different control resource sets (CORESETs).

8. The method according to claim 1, further comprising:
determining, by the terminal device, a plurality of transmission resources based on the plurality of downlink control channels; and
when a first condition is met, selecting, by the terminal device from the plurality of transmission resources, one transmission resource for transmission.

9. The method according to claim 8, wherein the first condition is met by:
transmission resources for transmitting two physical uplink control channels (PUCCHs) overlap, or a transmit power of an overlapping part of the PUCCHs exceeds a maximum transmit power, wherein the overlapping part refers to overlapping in time domain and comprises:
two transmission resources partially or completely overlap in time domain symbols; and
the two transmission resources are in a same slot, and a quantity of symbols occupied by each of the two transmission resources is greater than or equal to 3.

10. The method according to claim 8, further comprising selecting a transmission resource at the terminal device from the plurality of transmission resources by:
selecting a transmission resource that occupies more symbols;
selecting a transmission resource with a lower power; or
selecting a transmission resource based on hybrid automatic repeat request HARQ-ACK information.

11. A non-transitory computer-readable storage medium, wherein the computer-readable storage medium stores program instructions, and when the program instructions are run on a processor, the method according to claim 1 is performed.

12. An information transmission apparatus, comprising:
at least one processor; and
one or more memories coupled to the at least one processor and storing programming instructions for execution by the at least one processor to:
receive a plurality of downlink data channels, the plurality of downlink data channels being scheduled through a plurality of downlink control channels;
determine, based on the plurality of downlink data channels, one or more pieces of feedback information corresponding to at least two of the plurality of downlink data channels;
send the one or more pieces of feedback information through a same uplink control channel;
determine a first downlink control channel from the plurality of downlink control channels based on time domain resources or frequency domain resources on which the plurality of downlink control channels are located, or aggregation levels of the plurality of downlink control channels; and
determine a transmission resource based on resource indication information carried on the first downlink control channel, wherein the resource indication information indicates the transmission resource used to transmit the uplink control channel; and
send the uplink control channel through the transmission resource, wherein:
the first downlink control channel is a downlink control channel with a largest resource index in the plurality of downlink control channels, and the resource index is an index of a time domain resource on which the downlink control channel is located; or
the first downlink control channel is a downlink control channel with a smallest resource index in the plurality of downlink control channels, and the resource index is an index of a frequency domain resource on which the downlink control channel is located; or
the first downlink control channel is a downlink control channel with a highest resource aggregation level index in the plurality of downlink control channels, and the resource aggregation level index is an index of the resource aggregation level of the downlink control channel.

13. The apparatus according to claim 12, wherein the programming instructions are further executed by the at least one processor to:
determine a carrying manner of the one or more pieces of feedback information on the uplink control channel, wherein the carrying manner comprises:
the one or more pieces of feedback information are carried on the uplink control channel, wherein the uplink control channel comprises first indication information indicating a downlink data channel corresponding to one piece of feedback information in the one or more pieces of feedback information;
the one or more pieces of feedback information are carried on the uplink control channel through joint encoding; or
the one or more pieces of feedback information are carried on the uplink control channel through separate encoding, wherein the one or more pieces of feedback information are separately encoded in a predetermined sequence.

14. The apparatus according to claim 13, wherein after the one or more pieces of feedback information are separately encoded in the predetermined sequence, the carrying manner further comprises:
the one or more pieces of feedback information are carried on the uplink control channel in a cascading manner; or
the one or more pieces of feedback information are mapped to different symbols.

15. The apparatus according to claim 13, wherein the predetermined sequence is determined based on: a codeword identifier, a transport block identifier, a layer identifier, a number of a demodulation reference signal (DMRS) port, an antenna port identifier, or a quasi-co-location indication identifier.

16. The apparatus according to claim 12, wherein the plurality of downlink data channels are scheduled for the apparatus by a same network device or a plurality of different network devices.

17. The apparatus according to claim 12, wherein the plurality of downlink data channels are distinguished based on a resource of a downlink control channel scheduled by a network device.

18. The apparatus according to claim 12, further comprising a transceiver configured to receive the plurality of downlink control channels sent by a plurality of network devices, wherein the plurality of downlink control channels are associated with different control resource sets (CORESETs).

19. The apparatus according to claim 12, wherein the programming instructions are further executed by the at least one processor to:
determine a plurality of transmission resources based on the plurality of downlink control channels; and
when a first condition is met, select, from the plurality of transmission resources, one transmission resource for transmission.

20. The apparatus according to claim 19, wherein the first condition is met by:
transmission resources for transmitting two physical uplink control channels PUCCHs overlap, or
an overlapping part of the PUCCHs exceeds a maximum transmit power, wherein overlapping part refers to overlapping in time domain and comprises:
two transmission resources partially or completely overlap in time domain symbols; and the two transmission resources are in a same slot, and a quantity of symbols occupied by each of the two transmission resources is greater than or equal to 3.

21. The apparatus according to claim 19, wherein the programming instructions are further executed by the at least one processor to select from the plurality of transmission resources according to any one of the following rules:
selecting a transmission resource that occupies more symbols; selecting a transmission resource with a lower power; or selecting a transmission resource based on hybrid automatic repeat request HARQ-ACK information.

22. An information transmission method, comprising:
receiving, by a terminal device, a plurality of downlink data channels, the plurality of downlink data channels being scheduled through a plurality of downlink control channels;
determining, by the terminal device, based on the plurality of downlink data channels, one or more pieces of feedback information corresponding to at least two of the plurality of downlink data channels;
sending, by the terminal device, the one or more pieces of feedback information through a same uplink control channel;
determining, by the terminal device, a plurality of transmission resources based on the plurality of downlink control channels; and
when a first condition is met, selecting, by the terminal device from the plurality of transmission resources, one transmission resource for transmission, wherein the first condition is met by:
transmission resources for transmitting two physical uplink control channels (PUCCHs) overlapping, or
a transmit power of an overlapping part of the PUCCHs exceeding a maximum transmit power, wherein the overlapping part refers to overlapping in time domain and comprises:
two transmission resources partially or completely overlap in time domain symbols, and
the two transmission resources are in a same slot, and a quantity of symbols occupied by each of the two transmission resources is greater than or equal to 3.

23. The method according to claim 22, wherein the first condition is met by:
transmission resources for transmitting two physical uplink control channels (PUCCHs) overlap, or
a transmit power of an overlapping part of the PUCCHs exceeds a maximum transmit power, wherein the overlapping part refers to overlapping in time domain and comprises:
two transmission resources partially or completely overlap in time domain symbols; and
the two transmission resources are in a same slot, and a quantity of symbols occupied by each of the two transmission resources is greater than or equal to 3.

24. The method according to claim 22, further comprising selecting a transmission resource at the terminal device from the plurality of transmission resources by:
selecting a transmission resource that occupies more symbols;
selecting a transmission resource with a lower power; or
selecting a transmission resource based on hybrid automatic repeat request HARQ-ACK information.

* * * * *